(12) United States Patent
Taya et al.

(10) Patent No.: US 7,665,876 B2
(45) Date of Patent: Feb. 23, 2010

(54) BACKLIGHT UNIT

(75) Inventors: Masato Taya, Chikusei (JP); Tokutarou Komatsu, Abiko (JP); Yasushi Sugimoto, Tsukuba (JP); Tadashi Okuda, Chikusei (JP); Teruo Teshima, Nasu-machi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/289,426

(22) Filed: Oct. 28, 2008

(65) Prior Publication Data

US 2009/0147532 A1 Jun. 11, 2009

(30) Foreign Application Priority Data

Dec. 10, 2007 (JP) ............................ P2007-318250
Dec. 11, 2007 (JP) ............................ P2007-319594

(51) Int. Cl.
*F21V 7/04* (2006.01)

(52) U.S. Cl. ........................ 362/607; 362/620; 362/330; 362/331; 362/339

(58) Field of Classification Search ................. 362/603, 362/606, 607, 615, 617–620, 268, 328, 329, 362/331, 339, 300–301; 349/65; 359/640
See application file for complete search history.

(56) References Cited

U.S. PATENT DOCUMENTS 6,151,169 A * 11/2000 Kim ............................ 359/640

6,347,873 B1 * 2/2002 Hosseini et al. ............. 362/624
2008/0094552 A1 * 4/2008 Kim et al. .................... 349/113
2009/0002592 A1 * 1/2009 Ma et al. ....................... 349/56

FOREIGN PATENT DOCUMENTS

| JP | 07-198913 | 8/1995 |
|---|---|---|
| JP | 2739730 | 1/1998 |

* cited by examiner

*Primary Examiner*—Thomas M Sember
(74) *Attorney, Agent, or Firm*—Antonelli, Terry, Stout & Kraus, LLP.

(57) ABSTRACT

A backlight unit includes: light guide plate surrounded by main surfaces and end surfaces, one end surface facing a light source designated as entrance surface, one main surface designated as emitting surface; first prism sheet provided above the light guide plate, having first prism columns on a top surface and second prism columns on a bottom surface, each first prism column has first ridge line parallel or perpendicular to the entrance surface, each second prism column has second ridge line extending in a different direction from the first ridge line; second prism sheet provided above the first prism sheet, having third prism columns abutting each other on a top surface, each third prism column has third ridge line extending in a direction different from the first and second ridge lines; and reflection sheet facing the light guide plate below the light guide plate.

16 Claims, 19 Drawing Sheets

|       | Diffusion Film | Haze (%) | Unevenness (mm) | Front Luminance (cd/m²) |
|-------|----------------|----------|-----------------|-------------------------|
| Ex. 1 | –              | –        | 4.7             | 4120                    |
| Ex. 2 | A              | 54       | 4.9             | 2560                    |
| Ex. 3 | B              | 86       | 3.6             | 2610                    |
| Ex. 4 | C              | 91       | 3               | 2300                    |

FIG. 30

| | Light Guide Plate Reflection Surface | First Prism Column to Entrance Surface | γ(°) | First Prism Sheet θ1(°) | θ2(°) | φ1(°) | φ2(°) | Second Prism Sheet ξ(°) | ψ1(°) | ψ2(°) | Front Luminance (cd/m²) | Unevenness (mm) |
|---|---|---|---|---|---|---|---|---|---|---|---|---|
| Ex. 5 | Bottom | parallel | 45 | 10 | 48 | 29 | 29 | 90 | 10 | 48 | 4180 | 4.3 |
| Ex. 6 | Top | parallel | 45 | 10 | 48 | 29 | 29 | 90 | 10 | 48 | 4320 | 3.2 |
| Ex. 7 | Top | parallel | 45 | 15 | 48 | 29 | 29 | 90 | 45 | 45 | 3810 | 3.3 |
| Ex. 8 | Top | perpendicular | 45 | 15 | 48 | 29 | 29 | 90 | 45 | 45 | 3790 | 3.3 |
| Ex. 9 | Top | parallel | 35 | 15 | 48 | 29 | 29 | 90 | 45 | 45 | 3570 | 3 |
| Ex. 10 | Top | parallel | 55 | 15 | 48 | 29 | 29 | 90 | 45 | 45 | 3610 | 3 |
| Ex. 11 | Top | parallel | 45 | 20 | 48 | 29 | 29 | 90 | 45 | 45 | 3660 | 3.3 |
| Ex. 12 | Top | parallel | 45 | 10 | 48 | 29 | 29 | 90 | 45 | 45 | 3870 | 3.6 |
| Ex. 13 | Top | parallel | 45 | 15 | 40 | 29 | 29 | 90 | 45 | 45 | 3530 | 3.3 |
| Ex. 14 | Top | parallel | 45 | 15 | 55 | 29 | 29 | 90 | 45 | 45 | 3570 | 3.6 |
| Ex. 15 | Top | parallel | 45 | 15 | 48 | 25 | 25 | 90 | 45 | 45 | 3590 | 3.3 |
| Ex. 16 | Top | parallel | 45 | 15 | 48 | 35 | 35 | 90 | 45 | 45 | 3530 | 3 |
| Ex. 17 | Top | parallel | 45 | 15 | 48 | 29 | 29 | 90 | 15 | 48 | 4290 | 3.3 |
| Ex. 18 | Top | parallel | 45 | 15 | 48 | 29 | 29 | 90 | 5 | 48 | 4570 | 3.6 |
| Ex. 19 | Top | parallel | 45 | 15 | 48 | 29 | 29 | 90 | 20 | 48 | 4040 | 3.3 |
| Ex. 20 | Top | parallel | 45 | 15 | 48 | 29 | 29 | 90 | 15 | 40 | 3610 | 3.6 |
| Ex. 21 | Top | parallel | 45 | 15 | 48 | 29 | 29 | 90 | 15 | 55 | 3580 | 3.3 |
| Ex. 22 | Top | parallel | 45 | 15 | 48 | 29 | 29 | 100 | 15 | 48 | 3570 | 3.3 |
| Ex. 23 | Top | parallel | 45 | 15 | 48 | 29 | 29 | 80 | 15 | 48 | 3660 | 3.3 |
| Comp. Ex. 1 | Bottom | parallel | | | | | Diffusion Sheet + Two Upward Prism Sheets | | | | 3510 | 2.7 |
| Comp. Ex. 2 | Bottom | parallel | | | | | Diffusion Sheet + Downward Prism Sheet | | | | 4920 | 5.7 |
| Comp. Ex. 3 | Top | parallel | 45 | 15 | 48 | 29 | 29 | 90 | 45 | 45 | 3120 | 3.9 |
| Comp. Ex. 4 | Top | parallel | 30 | 15 | 48 | 29 | 29 | 90 | 45 | 45 | 2850 | 3 |
| Comp. Ex. 5 | Top | parallel | 60 | 15 | 48 | 29 | 29 | 90 | 45 | 45 | 3350 | 3.3 |
| Comp. Ex. 6 | Top | parallel | 45 | 25 | 48 | 29 | 29 | 90 | 45 | 45 | 3220 | 3.6 |
| Comp. Ex. 7 | Top | parallel | 45 | 15 | 35 | 29 | 29 | 90 | 45 | 45 | 3330 | 3 |
| Comp. Ex. 8 | Top | parallel | 45 | 15 | 60 | 29 | 29 | 90 | 45 | 45 | 3240 | 3.3 |
| Comp. Ex. 9 | Top | parallel | 45 | 15 | 48 | 20 | 20 | 90 | 45 | 45 | 2680 | 3 |
| Comp. Ex. 10 | Top | parallel | 45 | 15 | 48 | 40 | 40 | 90 | 45 | 45 | 1910 | 3.6 |
| Comp. Ex. 11 | Top | parallel | 45 | 15 | 48 | 29 | 29 | 90 | 55 | 48 | 3090 | 3.3 |
| Comp. Ex. 12 | Top | parallel | 45 | 15 | 48 | 29 | 29 | 90 | 15 | 35 | 3050 | 3.9 |
| Comp. Ex. 13 | Top | parallel | 45 | 15 | 48 | 29 | 29 | 90 | 15 | 60 | 3360 | 4.1 |
| Comp. Ex. 14 | Top | parallel | 45 | 15 | 48 | 29 | 29 | 105 | 20 | 48 | 4270 | 3.6 |
| Comp. Ex. 15 | Top | parallel | 45 | 15 | 48 | 29 | 29 | 75 | 20 | 48 | 3410 | 3.3 |

FIG. 37

|  | Distance K (mm) | Unevenness (mm) | Appearance |
|---|---|---|---|
| Ex. 24 | 1.7 | 3.5 | G |
| Ex. 25 | 2 | 3.3 | G |
| Ex. 26 | 2.5 | 3.8 | NG |
| Ex. 27 | 3 | 3.7 | NG |

BACKLIGHT UNIT

CROSS REFERENCE TO RELATED APPLICATIONS AND INCORPORATION BY REFERENCE

This application is based upon and claims the benefit of priority from prior Japanese Patent Applications P2007-318250 filed on Dec. 10, 2007, and P2007-319594 filed on Dec. 11, 2007; the entire contents of which are incorporated by reference herein.

BACKGROUND OF THE INVENTION

1. Field of the Invention

The present invention relates to a light guide plate and a backlight unit, which are used in a transmissive or semi-transmissive liquid crystal display apparatus, an advertisement plate, an emergency guide light and the like.

2. Description of the Related Art

In recent years, color liquid crystal display (LCD) apparatuses are widely used in various devices such as a portable telephone, a portable personal computer, a portable liquid crystal television or a video integrated liquid crystal television and the like. The LCD apparatus is basically provided with a backlight unit and a liquid crystal element. Configuration of the backlight unit can be roughly classified into a direct type and an edge light type. For the direct type backlight unit, a light source is placed just beneath a liquid crystal element. For the edge light type backlight unit, a light source is placed on a side of a translucent light guide plate so that a light is emitted from the entire surface of the light guide plate. From the viewpoint of downsizing the LCD apparatus, the edge light type backlight unit is commonly used.

In such LCD apparatus, it is required to extend the operating time of the battery. However, the backlight unit used in the LCD apparatus consumes a high proportion of the electric power, which is an obstacle for extending the operating life of the battery. In order to extend the operating life of the battery and to improve the practical value of the LCD apparatus, it is very important to reduce the electric power consumption of the backlight unit as much as possible. However, if luminance of the backlight unit is decreased by reducing the electric power consumption of the backlight unit, display quality of the LCD apparatus may undesirably deteriorate. Therefore, in order to reduce the electric power consumption without decreasing the luminance of the backlight unit, development of a backlight unit having high luminance efficiency and evenness is advancing.

Currently, the most popular backlight unit includes a light source 1, a light guide plate 2, a diffusion film 3, upward prism sheets 4, 5 and a reflection sheet 6, as shown in FIG. 1. The light emitted from the light source 1, such as a light emitting diode (LED) and the like, enters in the light guide plate 2 from an entrance surface of the light, which is an end surface 2a of the light guide plate 2, and is guided inside the light guide plate 2. The light is reflected by a reflection element 122 having a plurality of grooves, a plurality of dots and the like. The reflection element 122 is formed on a reflection surface. The reflection surface is a bottom surface 2b of the light guide plate 2. The light is emitted in an oblique direction from an emitting surface defined by a top surface 2c of the light guide plate 2. The arrangement of the reflection element is designed such that the in-plane distribution of the luminance is even. For example, a surface density of the reflection element is low in the vicinity of the light source 1, and the surface density becomes higher as the distance from the light source 1 becomes longer. Consequently, the LCD apparatus has an even luminance.

However, the light is emitted in the oblique direction from the light guide plate 2. Thus, in order to effectively use the light, it is necessary to deflect and collect the light in a normal direction of the backlight unit. Therefore, the diffusion sheet 3 is placed on the light guide plate 2 so as to improve the evenness and to deflect the output light from the light guide plate 2 in the normal direction of the backlight unit. Moreover, as the lens sheet for controlling the direction of the lights and collecting the lights, two laminated upward prism sheets 4, 5 are provided. The prism sheets have a plurality of prism columns, each of which has a triangular cross section with an apex angle of about 90°, and are disposed on the diffusion sheet 3. The upward prism sheets 4, 5 are laminated such that each array direction of the prism columns is orthogonal to each other, so as to improve luminance efficiency of the backlight unit.

In the orthogonal configuration in which each array direction of the prism columns of the upward prism sheets 4, 5 is orthogonal to each other, directional control is performed for deflecting the emitted light from the light guide plate 2 to the normal direction of the backlight unit mainly by refraction on slant surfaces of the prism columns. Therefore, since apart of the light is laterally reflected and refracted, it is difficult to improve luminance efficiency. On the other hand, another part of the light is totally reflected in a downward direction out of the light guide plate 2. This light may be reflected by the reflection sheet 6 placed on a backside of the backlight unit and can be reused. The reused light may be emitted from a different position from the reflected position of the light guide plate 2. Thus, it is effective for resolving in-plane uneven luminance and increasing uniformity of the luminance. Since the arrangement shown in FIG. 1 provides a good balance between the efficiency and evenness of the luminance, this arrangement is widely used.

However, since the backlight unit shown in FIG. 1 is provided with one diffusion film and two prism films, the number of parts is large. Therefore, the backlight unit shown in FIG. 1 has disadvantages in that fabrication cost of the backlight unit increases due to cumbersome assembling work, and thickness of the backlight unit increases.

A method for decreasing a number of parts of the backlight unit has been proposed (refer to JP-A H07-198913 (KOKAI)). In the proposed backlight unit, a double-sided prism sheet 11 shown in FIG. 2, which is used instead of the prism sheets 4, 5 in the backlight unit shown in FIG. 1, is provided on the diffusion sheet 3. On respective top and bottom surfaces of the prism sheet 11, prism columns whose array directions differ from each other are provided. The proposed backlight unit has an advantage in decreasing the number of parts of the backlight unit by one, since the prism sheet, in which functions of the two prism sheets are integrated into one, is used in combination with the diffusion film.

When using the lens sheet including stacked two upward prism sheets in which each prism column is arranged orthogonal to each other, Fresnel reflection loss occurs at the interface between the prism sheet on the output side and the air gap between the prism sheets. In the proposed backlight unit, the air gap between the prism sheets is eliminated by using the double-sided prism sheet 11 having the prism columns on the top and bottom surfaces. Thus, it is possible to prevent the Fresnel reflection loss and to increase luminance of the backlight unit.

However, in the downward prism columns provided on the bottom surface of the double-sided prism sheet, a slant surface of each prism column mainly acts as a total internal reflection plane. Since the output light from the diffusion film has a low directivity, the downward prism columns have a disadvantage in that efficiently directional control of the light in a predetermined direction is not possible. As a result, on each slant surface of the upward prism columns provided on the top surface of the double-sided prism sheet, reflection and refraction components of the light to the lateral direction may increase. Thus, there is a problem such that luminance of the backlight unit may decrease compared with the backlight unit including the lens sheet having two upward prism sheets in which the array directions of respective prism columns of the two upward S prism sheets are orthogonal to each other.

A backlight unit having a downward prism sheet used as a lens sheet has been proposed (refer to JP No. 2739730). The proposed backlight unit is designed such that the diffusion film 3 and two upward prisms 4, 5 shown in FIG. 1 are replaced with a downward prism sheet 21, as shown in FIG. 3. The downward prism sheet 21 has a plurality of prism columns, each of which has a triangular cross section. The prism sheet 21 is downwardly disposed so that the prism columns face the top surface 2c of the light guide plate 2. The array direction of the prism columns is parallel to the end surface 2a of the light guide plate 2. The obliquely directed light emitted from the light guide plate 2 is refracted on a slant surface of each prism columns and totally reflected at another slant surface in the normal direction of the backlight unit. Thus, the emitted light from the light guide plate 2 is deflected in the normal direction of the backlight unit. In the configuration using the downward prism sheet 21, the directional light emitted from the light guide plate 2 is directly and totally deflected in the normal direction of the backlight unit. Thus, the front luminance efficiency may be increased in principle.

Furthermore, the number of parts in the lens sheet can be reduced to only one downward prism sheet 21. However, since the emitted light has a high directivity, it is difficult to reduce unevenness of the entering light and to assure even luminance. In practice, the diffusion film is stacked on the downward prism sheet 21 in many cases.

Recently, in the display of portable devices, LEDs are usually used as the light source. As shown in FIG. 4, in case of using LEDs as the light source 1, when the backlight is turned on and viewed from the front, an uneven light entrance region 33, in which a dark portion 31 and a bright portion 32 are clearly split due to the directional characteristics of the light emitted from the LEDs, occurs in the vicinity of the light entrance portion of the backlight. When reducing thickness and downsizing of the devices, the area ratio of a display area 34 in the backlight unit tends to be increased, and a distance LL of a light entrance area 35 between the entrance surface 2a and the end of the display area 34 is decreased. For this reason, minimization of the unevenness of the entering light is also an important subject.

The backlight unit of the downward prism sheet configuration disclosed in JP No. 2739730 has a disadvantage in that, since the output light from the light guide plate is emitted in the normal direction directly with one deflection without any redirect by reflection, a region where the uneven light is visible in the vicinity of the light entrance portion may increase. Also, even if the diffusion sheet is stacked on the downward prism sheet to improve the light unevenness, the light unevenness cannot be effectively reduced. Thus, in the actual situation, the configuration using a downward prism sheet is limited to the backlight unit in which the non-display area is large.

SUMMARY OF THE INVENTION

An object of the present invention is to provide a backlight unit capable of reducing a number of parts and decreasing uneven light characteristics with high luminance efficiency.

An aspect of the present invention inheres in a backlight unit including a light source; a light guide plate surrounded by two main surfaces and a plurality of end surfaces connecting the main surfaces, the main surfaces are substantially orthogonal to the end surfaces, one of the end surfaces facing the light source is designated as an entrance surface, one of the main surfaces is designated as an emitting surface; a first prism sheet provided above the light guide plate, having a plurality of first prism columns abutting each other on a top surface of the first prism sheet and a plurality of second prism columns abutting each other on a bottom surface of the first prism sheet, each of the first prism columns has a first ridge line parallel or perpendicular to the entrance surface, each of the second prism columns has a second ridge line extending in a different direction from the first ridge line; a second prism sheet provided above the first prism sheet, having a plurality of third prism columns abutting each other on a top surface of the second prism sheet, each of the third prism columns has a third ridge line extending in a direction different from the first and second ridge lines; and a reflection sheet facing the light guide plate below the light guide plate.

BRIEF DESCRIPTION OF DRAWINGS

FIG. 4 is a view showing an example of light unevenness in an entrance portion when the backlight unit is turned on;

FIG. 30 is a table showing an example of measurement results of the light unevenness of the backlight unit according to the embodiment of the present invention.

FIG. 37 is a table showing an example of results of light unevenness measurement and appearance evaluation of the backlight unit according to the embodiment of the present invention.

DETAILED DESCRIPTION OF THE INVENTION

Figure 1:
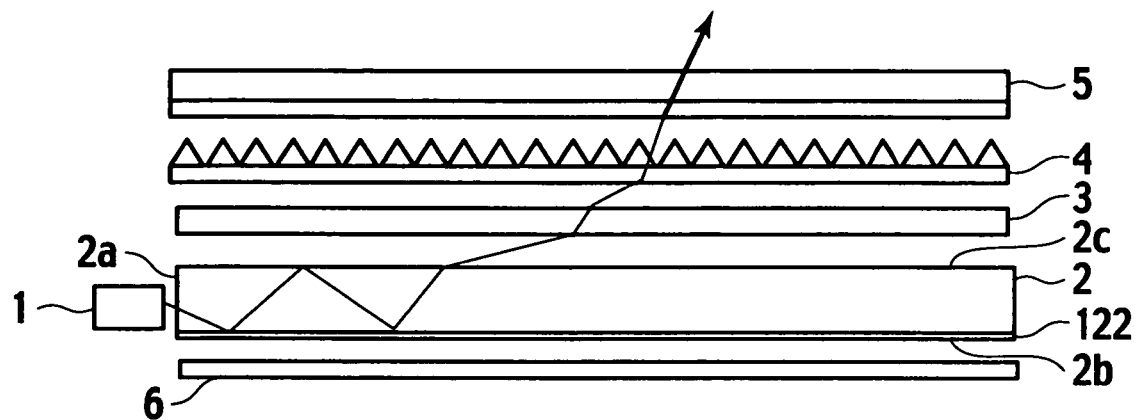
FIG. 1 is a schematic view showing an example of a configuration of a conventional backlight unit.
Figure 2:
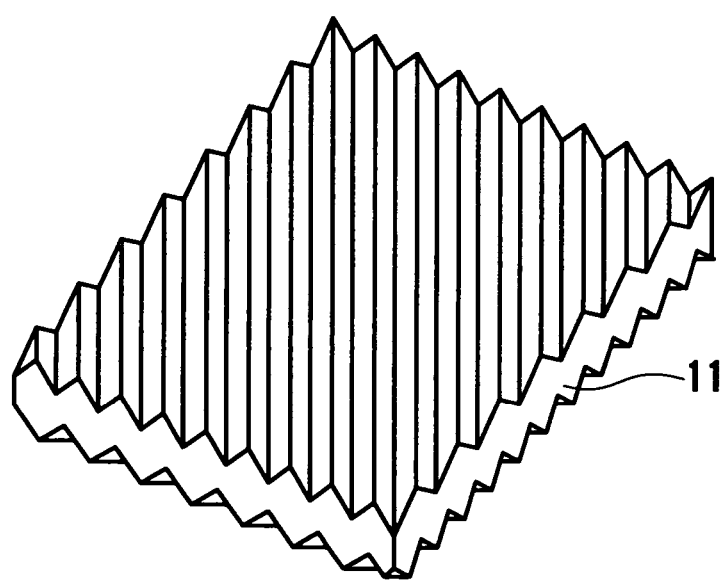
FIG. 2 is a schematic view showing an example of a double-sided prism sheet of a conventional backlight unit.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The inventors have performed angle distribution measurement of the output light from the light guide plate, light unevenness measurement of an entrance portion, visual observation in the vicinity of a light entrance area, shape design of a reflection element in the vicinity of the light entrance area of the light guide plate, and angle distribution simulation of the output light. Moreover, the inventors have performed detailed study of shape and array direction of prism column in a double-sided prism sheet or a single-sided prism sheet. As a result, the inventors have achieved a backlight unit including a lens sheet, which are capable of satisfying both of luminance efficiency and even light characteristics, and reducing a number of parts of the backlight unit.

Figure 5:
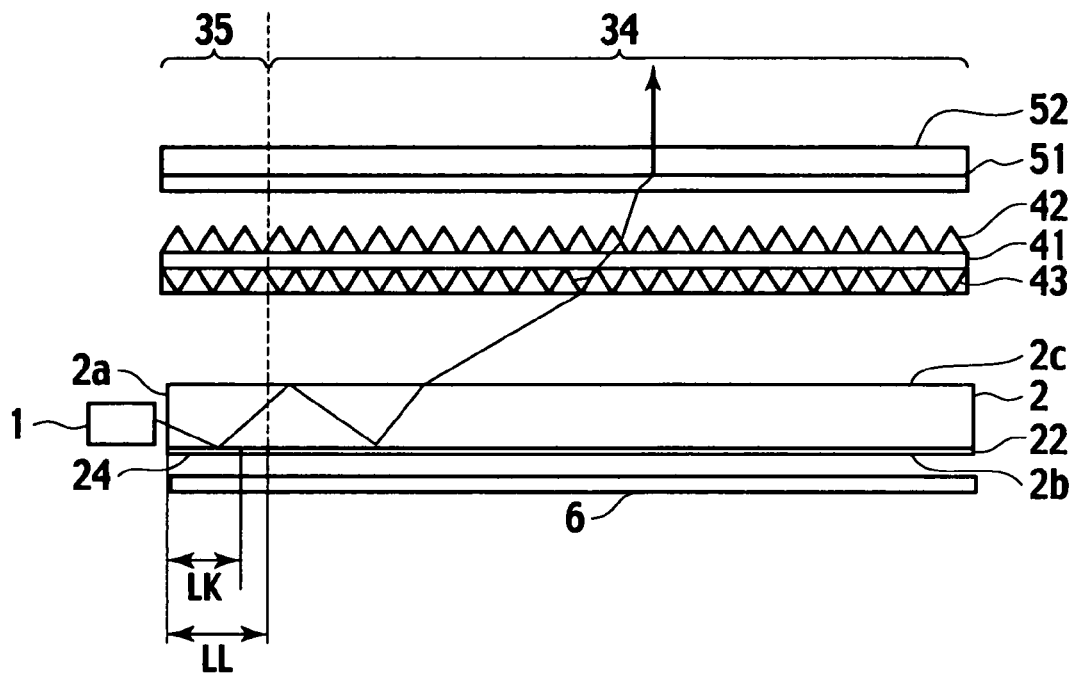
FIG. 5 is a cross sectional view showing an example of a backlight unit according to an embodiment of the present invention.

The backlight unit according to the embodiment of the present invention includes a light source 1, a light guide plate 2, a lens sheet (41, 51) and a reflection sheet 6, as shown in FIG. 5. The lens sheet (41, 51) includes a prism sheet 41 and a prism sheet 51. A plurality of prism columns 42 are provided on a top surface of the prism sheet 41 so as to face a flat bottom surface of the prism sheet 51. A plurality of prism columns 43 are provided on a bottom surface of the prism sheet 41 so as to face the light guide plate 2. A plurality of prism columns 52 are provided on a top surface of the prism sheet 51 in the opposite side with regard to the prism sheet 41.

The light guide plate 2 is surrounded by a top surface (first main surface) 2c, a bottom surface (second main surface) 2b, and a plurality of end surfaces connecting the top and bottom surfaces 2c, 2b. The light guide plate 2 has reflection elements 22, 24 on the bottom surface 2b. The reflection element 22 is formed in a first region corresponding to a display area 34 of the backlight unit. The reflection element 24 is formed in a second region corresponding to a light entrance area of the backlight unit. The reflection element 24 is provided in a range of a distance LK from an end surface 2a of the light guide plate 2. The distance LK is shorter than a distance LL between the end surface 2a of the light guide plate 2 and the display area 34.

The light source 1 is positioned so as to face at least one of end surfaces, for example, the end surface 2a of the light guide plate 2. The first prism sheet 41 is positioned so as to face the top surface 2c of the light guide plate 2. The reflection sheet 6 is positioned so as to face the bottom surface 2b of the light guide plate 2. The prism sheet 51 is positioned in an opposite side of the light guide plate 2 with regard to the prism sheet 41.

In the light guide plate 2, the end surface 2a is designated as an entrance surface of the light. The bottom surface 2b substantially orthogonal to the end surface 2a is designated as a reflection surface. The top surface 2c substantially orthogonal to the end surface 2a is designated as an emitting surface of the light. The light of the light source 1, which enters from the end surface 2a of the light guide plate 2, is reflected on the bottom surface 2b of the light guide plate 2, and is obliquely emitted from the top surface 2c of the light guide plate 2. The light incident to the lens sheet (41, 51) from the light guide plate 2 is collected by the prism sheets 41, 51, respectively, and deflected vertically to the lens sheet (41, 51). The light emitted from the bottom surface 2b of the light guide plate 2 is reflected by the reflection sheet 6 and redirected to the light guide plate 2.

Figure 6:
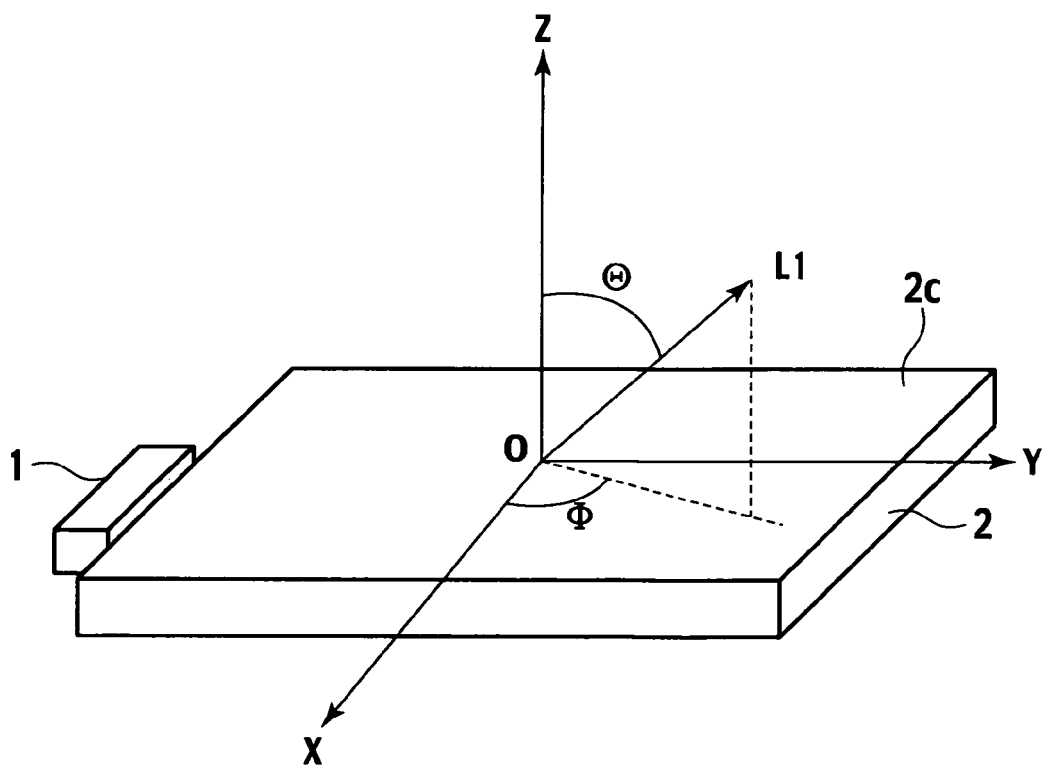
FIG. 6 is a schematic view describing the definition of angles of an output light from the light guide plate.

As shown in FIG. 6, on the top surface 2c of the light guide plate 2, a point where an output light L1 is emitted from the top surface 2c is defined as an origin of coordinates. The direction parallel to the end surface 2a is defined as an X-axis. The direction orthogonal to the X-axis and away from the light source 1 is defined as a Y-axis. The direction orthogonal to the X-axis and the Y-axis and oriented upwardly from the top surface 2c is defined as a Z-axis. Additionally, a zenith angle between the output light L1 from the top surface 2c and the Z-axis is denoted by $\Theta$, and an azimuth angle between a projection line to the top surface 2c of the output light L1 and the X-axis is denoted by $\Phi$. The output direction of the light can be defined by the zenith angle $\Theta$ and the azimuth angle $\Phi$. For example, the X direction is the zenith angle $\Theta$ of 90° and the azimuth angle $\Phi$ of 0°. The Y direction is the zenith angle $\Theta$ of 90° and azimuth angle $\Phi$ of 90°. The Z direction is the zenith angle $\Theta$ of 0°.

Figure 7:
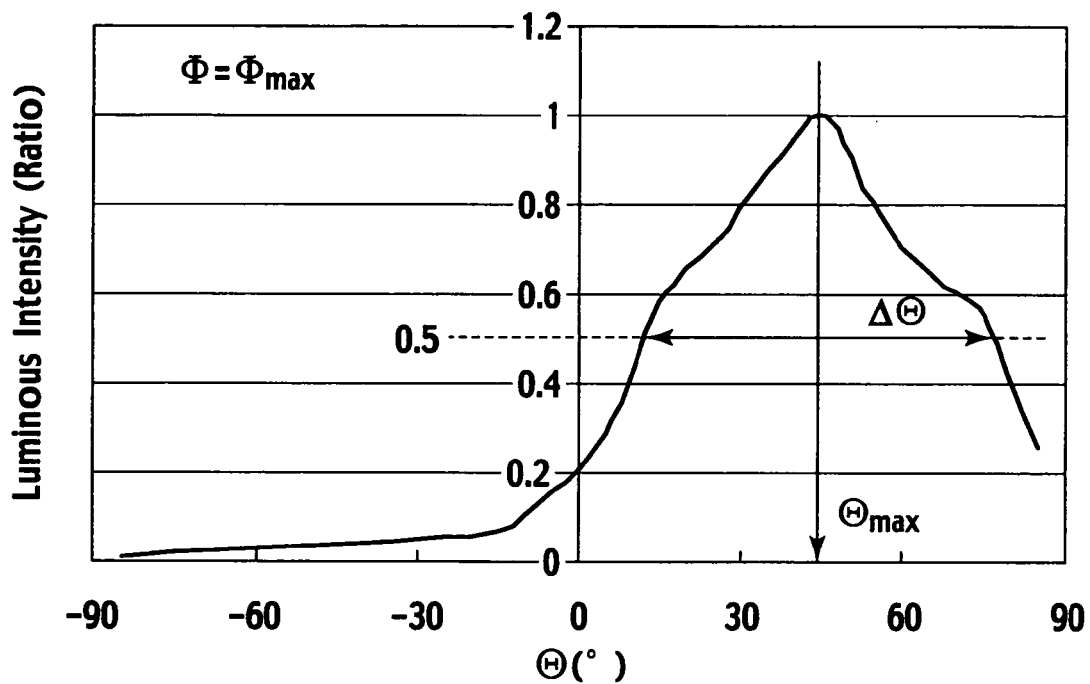
FIGS. 7 and 8 are views describing angle distributions of luminous intensities of the output lights from the light guide plate.
Figure 8:
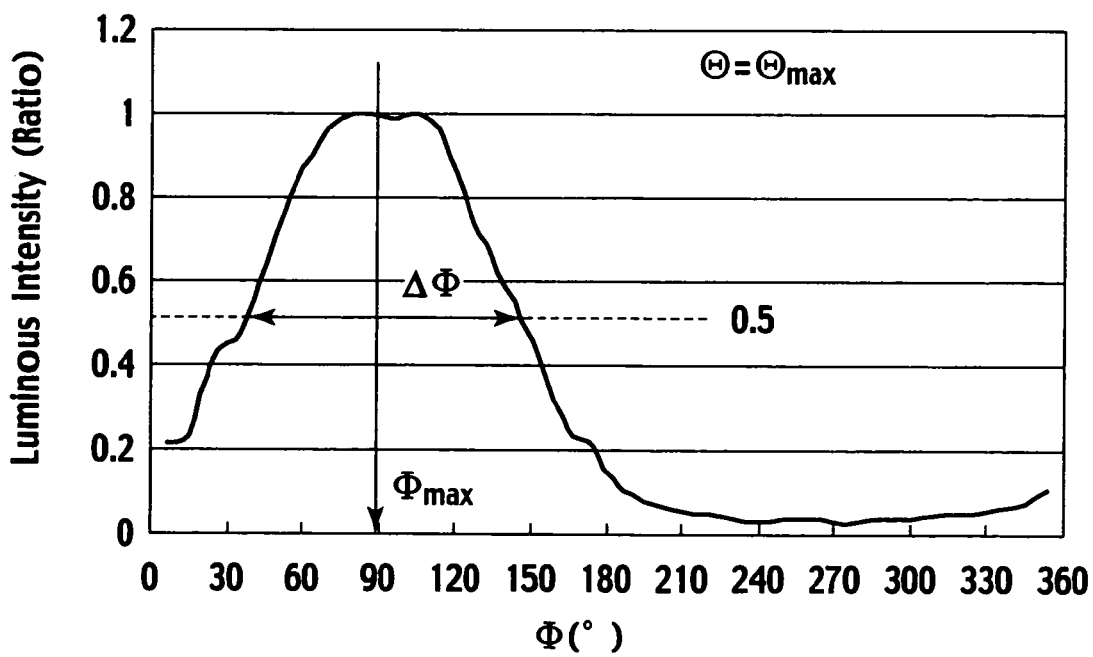

Also, in the luminous intensity distribution with regard to the zenith angle $\Theta$ and the azimuth angle $\Phi$ of the output light from the emitting surface, as shown in FIGS. 7 and 8, the zenith angle $\Theta$ and the azimuth angle $\Phi$ at which the luminous intensity is the highest are denoted by $\Theta$max and $\Phi$max, respectively, and the full width at half maximum (FWHM) angles of the zenith angle $\Theta$ and the azimuth angle $\Phi$ are denoted by $\Delta\Theta$ and $\Delta\Phi$, respectively.

(Lens Sheet)

Figure 9:
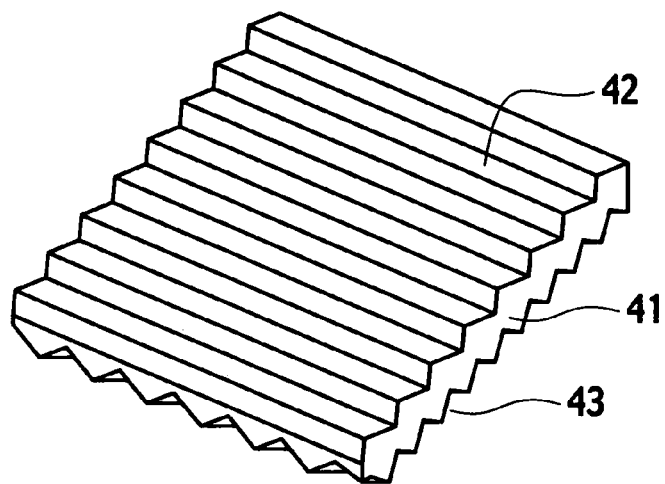
FIGS. 9 to 12 are schematic views showing an example of the first prism sheet according to the embodiment of the present invention.

The first prism sheet 41 according to the embodiment is the double-sided prism sheet, which has a plurality of first prism columns 42 on the top surface and a plurality of second prism columns 43 on the bottom surface, as shown in FIG. 9. The first and second prism columns 42, 43 have substantially triangular cross sectional shapes, and heights of Ha, Hb, respectively, as show in FIGS. 10 and 11. In the cross section cut along a direction orthogonal to each ridge line of the first prism columns 42, angles between the normal to the bottom surface from the apex and two slant surfaces of each prism column are denoted by θ1, θ2. In the cross section cut along a direction orthogonal to each ridge line of the second prism columns 43, angles between the normal to the top surface from the apex and two slant surfaces of each prism column are denoted by φ1, φ2.

Figure 12:
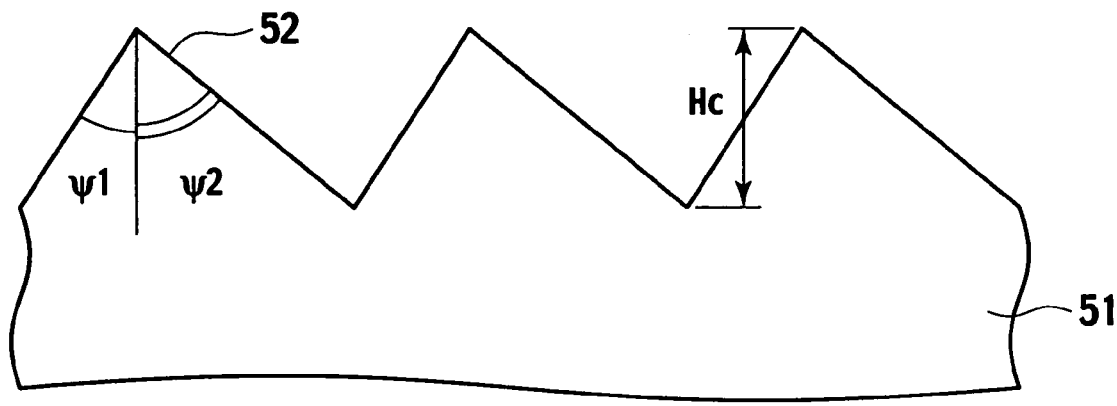
Figure 13:
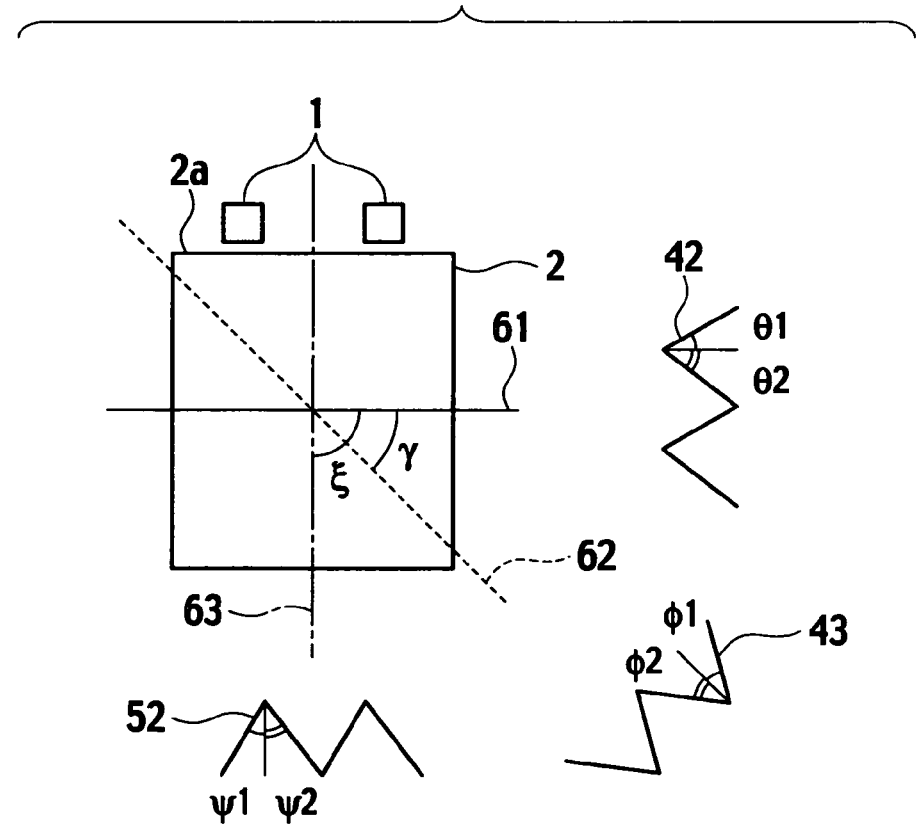
FIGS. 13 to 16 is a schematic view showing examples of array directions of ridge lines of the lens sheet according to the embodiment of the present invention.
Figure 14:
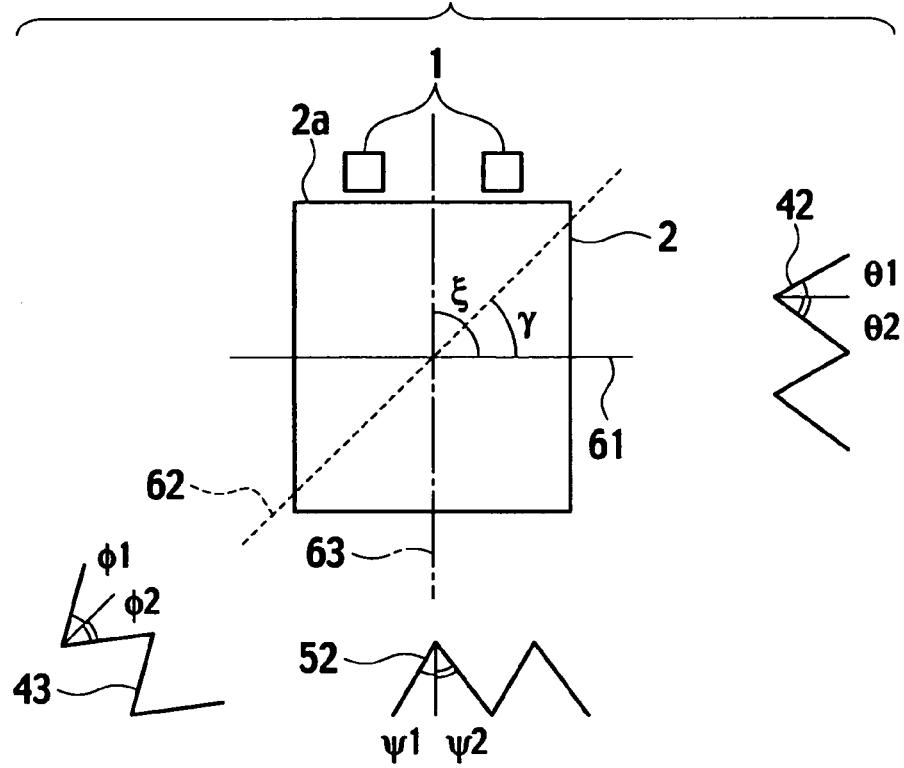
Figure 15:
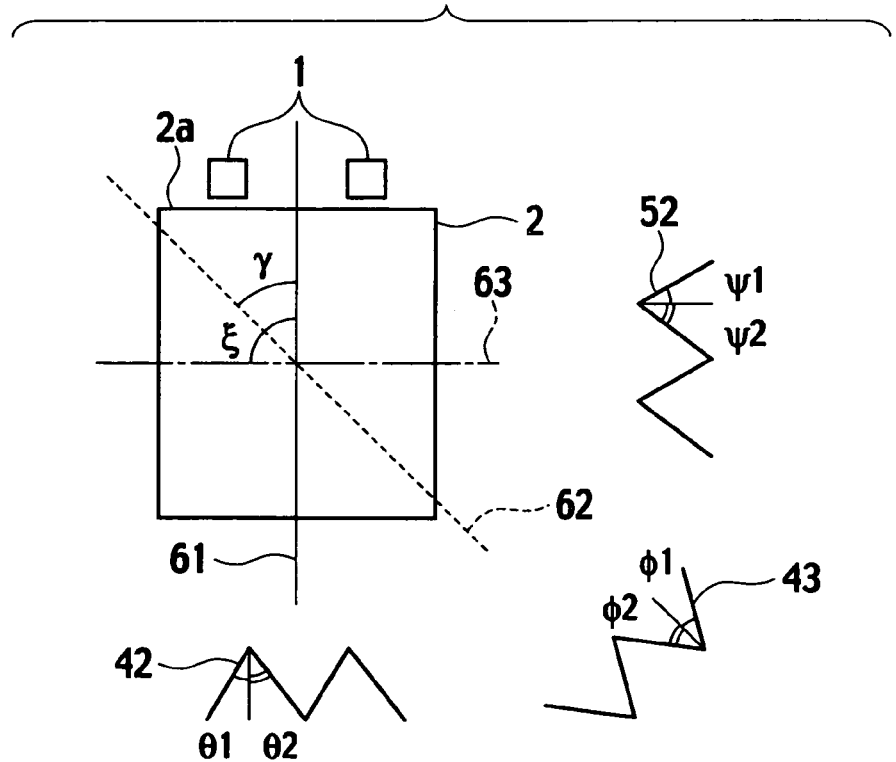
Figure 16:
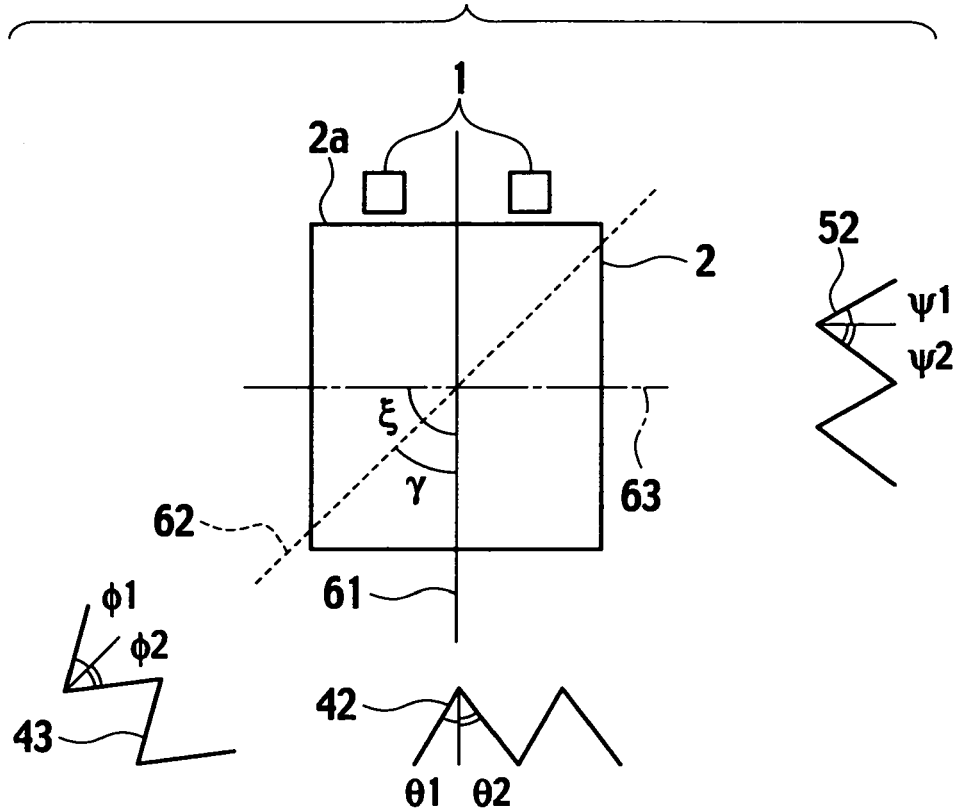

Also, the second prism sheet 51 shown in FIG. 5 has a plurality of third prism columns 52 on the top surface. The third prism columns 52, as shown in FIG. 12, have substantially triangular cross sectional shapes, and height of Hc. In the cross section cut along a direction orthogonal to each ridge line of the third prism columns 52, angles between the normal to the top surface from the apex and two slant surfaces of each prism column are denoted by ψ1, ψ2.

As shown in FIGS. 13 to 16, the first prism sheet 41 is arranged such that an array direction 61 of a ridge line (ridge line direction) of each first prism column 42 is parallel or perpendicular to the end surface 2a which is the entrance surface of the light guide plate 2. As shown in FIGS. 13 and 14, or FIGS. 15 and 16, a ridge line direction 62 of each second prism column 43 can be arranged for the ridge line direction 61 of each first prism column 42 in two symmetrical directions with respect to the line orthogonal to the end surface 2a. An angle between the ridge line direction 61 of each first prism column 42 and the ridge line direction 62 of each second prism column 43 is denoted by γ, and an angle between the ridge line direction 61 of each first prism column 42 and a ridge line direction 63 of each third prism column 52 is denoted by ξ. Note that, if the ridge line directions 61, 62 and 63 of each of the first to third prism columns 42, 43 and 52 are not parallel to the perpendicular direction of the end surface 2a, the angles θ1, φ1 and ψ1 are assigned to the side of the end surface 2a.

For example, in the backlight unit shown in FIG. 5, the zenith angle Θmax and the azimuth angle Φmax, at which the intensity of the output light from the light guide plate 2 is maximal, are assumed to be about 70°, and about 90°, respectively. Change of the direction of the main light beam having a maximum light intensity will be discussed. The light beams emitted from the light source 1 enter from the end surface 2a into the light guide plate 2 and are guided inside the light guide plate 2. Among the guided light beams, the light beam reflected by the reflection element 22 formed on the bottom surface 2b is emitted from the top surface 2c in an oblique direction with the zenith angle Θ of about 70° and the azimuth angle Φ of about 90°. The output light is refracted at the slant surface defined by the angle φ1 of the second prism column 43 of the first prism sheet 41 and totally reflected at the slant surface defined by the angle φ2. At this time, the light beam is guided in the direction with the zenith angle Θ of about 27° and the azimuth angle Φ of about 135° inside the first prism sheet 41. Moreover, the light beam is refracted at the slant surface defined by the angle θ2 of the first prism column 42 of the first prism sheet 41 and emitted from the first prism sheet 41 in a direction with the zenith angle Θ of about 28° and the azimuth angle Φ of about 180°. The light beam incident to the second prism sheet 51 is refracted at the bottom surface in which the prism columns are not formed. Moreover, the light beam guided inside the second prism sheet 51 is refracted at the slant surface defined by the angle ψ2 of the third prism column 52 and emitted with the zenith angle Θ of about 0°, namely, in the front direction.

Here, the angles φ1, φ2 of the second prism column 43 of the first prism sheet 41 are in a range of about 25° to about 35°, and in a range of about 25° to about 35°, respectively. When the angles φ1, φ2 are less than 25°, or greater than 35°, the light beam is deflected from the predetermined angle. As a result, the front luminance through the second prism sheet 51 is decreased. In addition, there are no special limitations in pitches between the second prism columns 43. However, the pitch of the second prism columns 43 is desirably in a range of about 20 μm to about 60 μm from the viewpoint of quality and productivity of the first prism sheet 41. A curvature may be applied to the apex of the second prism columns 43 in so far as luminance is not decreased, not to damage the surface of the light guide plate 2 when the backlight unit is assembled. The range of the curvature is desired to be about 3 μm or less.

The angles θ1, θ2 of the first prism columns 42 of the first prism sheet 41 are in a range of about 5° to about 20°, and in a range of about 40° to about 55°, respectively. When the angles θ2 is less than 40°, or greater than 55°, the light beam is deflected from the predetermined angle. As a result, the front luminance of the backlight unit is decreased. To increase the front luminance, a range of about 45° to about 50° is more preferable. When the light beam is not incident to the slant surface defined by the angle θ1, the luminance may rather increase. To do so, the angle θ1 may be as small as possible. However, from the viewpoint of the quality and productivity of the first prism sheet 41, the angle θ1 is desirably in a range of about 5° to about 20°. In addition, there are no special limitations in a pitch of the first prism columns 42. However, the pitch of the first prism columns 42 is desirably in a range of about 20 μm to about 60 μm from the viewpoint of the quality and productivity of the first prism sheet 41.

It is desirable for the ridge line direction of the first prism columns 42 to be provided substantially parallel or perpendicular to the entrance surface of the light guide plate. When the ridge line direction of the first prism columns 42 is significantly deviated from the direction parallel or perpendicular to the entrance surface of the light guide plate, there are problems, such that complexity of the optical design may be increased, that the front luminance may be decreased even if the angles γ, ξ of the ridge line directions of the second and third prism columns 43, 52 to the first prism columns 42 are optimally designed, and that the material yield may be decreased because it is necessary to form the prism columns at an angle in the mass production.

The angle γ between the ridge line directions of the first and second prism columns 42, 43 is desirably in a range of about 35° to about 55°, and more desirably in a range of about 40° to about 50°. This is because, out of the above-mentioned range, the front luminance is decreased in consequence of deflecting the light transmitted through the first prism sheet 41 in a direction largely different from the predetermined target angle.

The angles ψ1, ψ2 of the third prism columns 52 of the second prism sheet 51 are desirably in a range of about 5° to about 45°, and in a range of about 40° to about 55°. This is because, out of the above-mentioned range, the light beam is refracted from the front to the side direction, and the front luminance is decreased. In particular, when emphasizing the front luminance property, the angles ψ1, ψ2 is desirably in a range of about 5° to about 20°, and in a range of about 40° to about 55°, respectively. Note that, when increasing a view angle with a certain luminance, the angles ψ1, ψ2 may be in a range of about 20° to about 55°, and in a range of about 40° to about 55°, respectively. Moreover, the slant surface defined by the angle ψ2 of the third prism column 52 has the function for totally reflecting a part of light beams in a downward direction and has the action for reducing the entrance unevenness. There are no special limitations in a pitch of the third prism columns 52. The pitch of the third prism columns 52 is desirably in a range of about 20 μm to about 60 μm from the viewpoint of the quality and productivity of the second prism sheet 51.

The bottom surface of the second prism sheet 51 is a flat surface on which prism columns are not formed. However, in order to prevent adhesion to the first prism sheet 41 and to adjust the view angle, micro protrusions and the like may be formed on the bottom surface of the second prism sheet 51. The angle $\xi$ between the ridge line directions of the third prism column 52 of the second prism sheet 51 and the first prism column 42 of the first prism sheet 41 is required to be in a range of about 80° to about 100°. Out of the above-discussed range, the front luminance may be decreased.

The first prism sheet 41 and the second prism sheet 51 according to the embodiment may be preferably manufactured by using a material having high transmittance for a visible light and relatively high refractive index. For example, a transparent resin, such as an acrylic resin, a polycarbonate resin, a vinyl chloride resin, an active energy beam curing type resin and the like, may be used. The active energy beam curing type resin is desirably among the best from the viewpoint of abrasion resistance, handling, productivity, and the like, of the prism sheet. Also, an additive agent, such as an oxidation inhibitor, an ultraviolet absorber, a yellowing inhibitor, a bluing agent, a colorant, a diffusing agent and the like, may be added to the prism sheet, as necessary.

As a method of manufacturing the prism sheet, it is possible to use a general molding method, such as an extrusion, an injection molding and the like. When the active energy beam curing type resin is used to manufacture the prism sheet, the prism unit is formed using the active energy beam curing type resin on a transparent substrate, such as a transparent film and a transparent sheet, made of a transparent resin, such as a polyester resin, an acrylic resin, a polycarbonate resin, a vinyl chloride resin, a polymethacrylimide resin, and a polyolefin resin. For example, an active energy beam curing type resin in liquid form is injected into a prism mold in which a predetermined prism pattern is formed, and overlapped on a transparent substrate. Next, an active energy beam, such as a ultraviolet ray, an electron beam and the like, is irradiated through the transparent substrate, so as to polymerize and cure the active energy beam curing type resin. Thereafter, the cured resin on the transparent substrate is removed from the prism mold, and thus the prism sheet is fabricated.

(Light Guide Plate)

The procedure for achieving the light guide plate according to the embodiment of the present invention is preferably as described below.

Step 1: Light unevenness of the light entrance area is measured using diffusion films having different hazes inserted between the light guide plate and a lens sheet (light collection sheet) of the backlight unit. Here, the term "haze" is referred to a diffusion ratio of light.

Step 2: The diffusion film having a haze that improves the light unevenness (uneven light) is selected, and luminance angle distribution of the lights passing through the selected diffusion film is measured.

Step 3: The measured luminance angle distributions are converted to luminous intensity angle distributions, respectively.

Step 4: The rest of the angle distribution eliminating the angle components of the lights, which clearly does not have an improvement effect for the light unevenness, or emitted in unnecessary directions, from the converted luminous intensity angle distributions is determined as a target angle distribution for improving the light unevenness in the vicinity of the light entrance portion.

In the foregoing steps, the position of the angle distribution measurement in Step 2 is preferably the center of the light guide plate. Because, in the angle distribution in the vicinity of the light entrance portion, the actual area for the luminance measurement in the high angle side becomes large, and an accurate measurement may be difficult. The reason why the luminance is converted into the luminous intensity in Step 3 is that, since the luminance angle distribution becomes large in the high angle side in accordance with the definition of the luminance, the luminance distribution is biased to the high angle side, and it is difficult to accurately determine the proper range of the angle distribution to improve the light unevenness.

Figure 17:
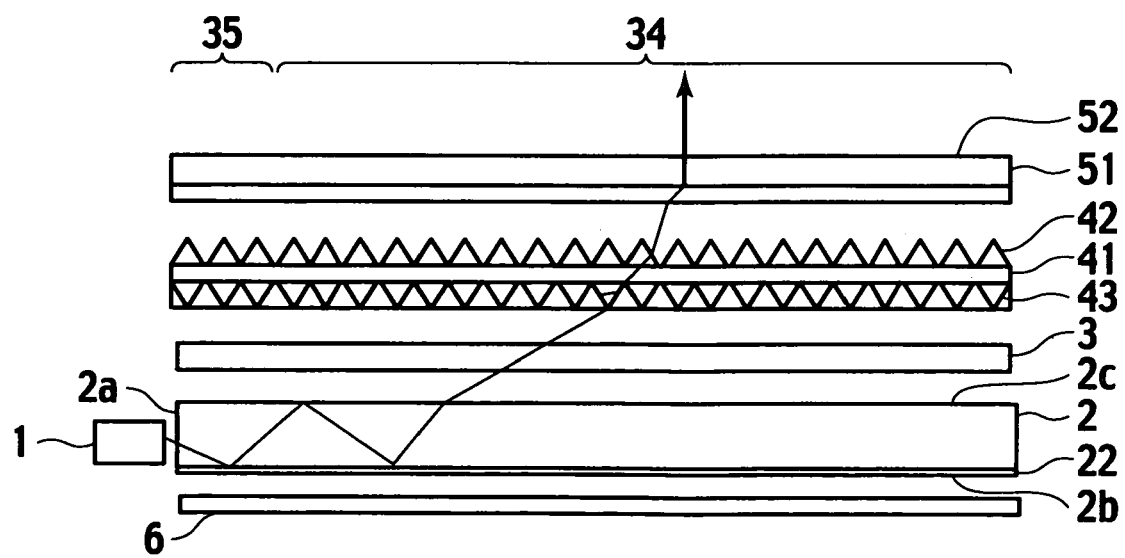
FIG. 17 is a cross sectional view showing an example of a backlight unit used in a description of an embodiment of the present invention.

The embodiment will be described by using a backlight unit shown in FIG. 17. As shown in FIG. 17, the backlight unit includes a light source 1, a light guide plate 2, a diffusion sheet 3, a lens sheet (41, 51) and a reflection sheet 6. The lens sheet (41, 51) includes a first prism sheet 41 and a second prism sheet 51. The light source 1 is positioned so as to face at least one of end surfaces, for example, an end surface 2a of the light guide plate 2. The diffusion sheet 3 is positioned so as to face the top surface 2c of the light guide plate 2. The reflection sheet 6 is positioned so as to face the bottom surface 2b of the light guide plate 2. The first prism sheet 41 is positioned so as to face the diffusion sheet 3. The second prism sheet 51 is positioned in an opposite side of the diffusion sheet 3 with regard to the first prism sheet 41.

In the light guide plate 2, the end surface 2a is designated as an entrance surface of the light. The top surface 2c substantially orthogonal to the end surface 2a is designated as an emitting surface of the light. The light of the light source 1 enters from the end surface 2a of the light guide plate 2 and is obliquely emitted from the top surface 2c of the light guide plate 2. The light incident to the lens sheet (41, 51) from the light guide plate 2 is collected by the first and second prism sheets 41, 51, respectively, and deflected vertically to the lens sheet (41, 51). The light emitted from the bottom surface 2b of the light guide plate 2 is reflected by the reflection sheet 6 and redirected to the light guide plate 2.

Three LEDs (for example, NSCW215 made by Nichia Corporation) are used for the light source 1. The light source 1 is not limited to the LED. For example, the light source, such as a cold cathode fluorescent lamp (CCFL) and the like, may be used.

A commercially available silver sheet (for example, LUIRE MIRROR 60W10 made by REIKO Co., Ltd.) is used for the reflection sheet 6. There are no special limitations for the reflection sheet 6. However, the use of a reflection sheet, such as the silver sheet and the like, having a mirror reflection function is advantageous from the viewpoint of the luminance.

The light guide plate 2 has, for example, a width of about 30.8 mm, a length of about 39.2 mm and a thickness of about 0.6 mm. For the light guide plate 2, a transparent resin, such as polycarbonate, acryl, polyvinyl chloride, and the like, may be used. For example, the light guide plate 2 can be fabricated by injection molding and the like using a polycarbonate molding material, such as LC1500 made by Idemitsu Kosan Co., Ltd. A reflection element 22 is provided on the bottom surface 2b of the light guide plate 2.

For the reflection element 22, a plurality of grooves may be used. The shape and arrangement of the grooves are designed by ray tracing simulation so that in-plane luminance distribution of the output lights from the light guide plate 2 is even. As a result of the simulation, the grooves having bottom angles between about 1.7° and about 2°, which are continuously formed in abutting relationship with each other on the bottom surface 2b, are used for the reflection element 22. In the display area 34 provided in the center of the light guide plate 2, the zenith angle θmax at which the luminous intensity of the output light is maximal is about 68°. Note that a plurality of dots may be used for the reflection element 22.

For example, a hologram diffuser is provided on the top surface 2c of the light guide plate 2. A prism pattern which includes two kinds of prism columns having ridge lines in the thickness direction of the light guide plate 2 is provided on the end surface 2a. The apex angles of the prism columns are about 100° and about 140°, respectively. The prism pattern of the end surface 2a is formed such that an area ratio of portions where the prism columns having the apex angles of about 100° and about 140° are formed in the end surface 2a, and a flat portion where the prism columns are not formed in the end surface 2a, is about 9:8:7.

For the diffusion sheet 3, a commercially available diffusion film (for example, LIGHTUP made by Kimoto Co., Ltd.) is used. For the diffusion sheet 3, three kinds of diffusion films having different hazes of about 54%, about 86% and about 91% are used.

Figure 10:
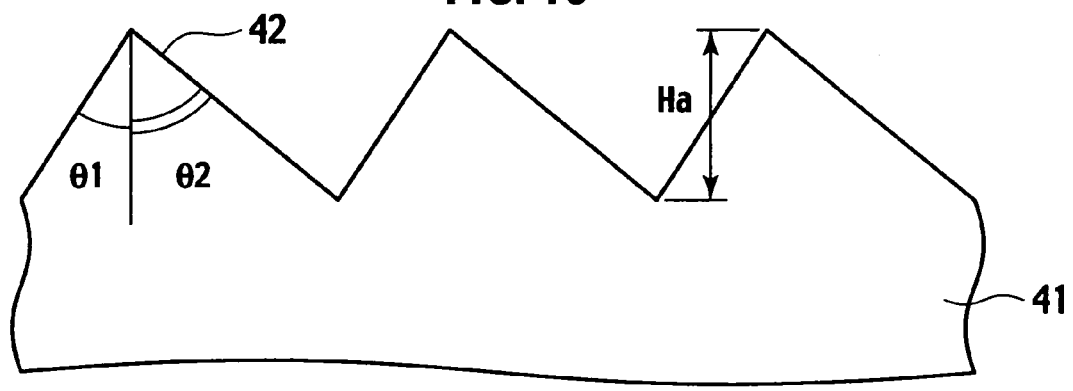
Figure 11:
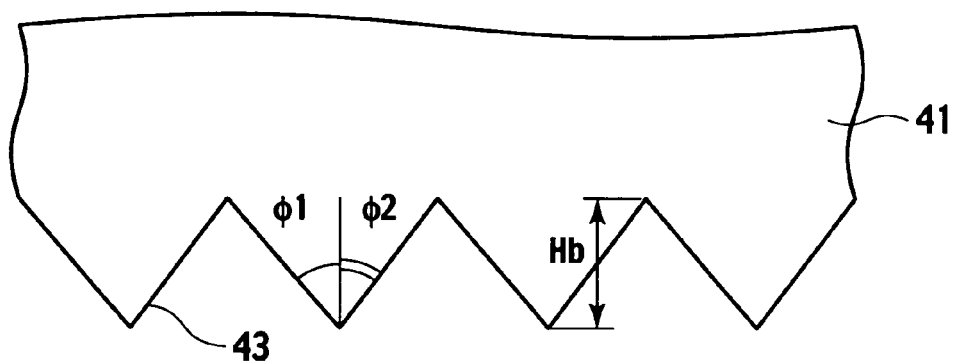

Each of the first and second prism sheets 41, 51 is fabricated by molding using a prism mold. In each of the first prism columns 42, the angles $\theta_1$, $\theta_2$ shown in FIG. 10 are about 15° and about 48°, respectively, and the pitch is about 30 μm. In each of the second prism columns 43, both of the angles $\phi_1$, $\phi_2$ shown in FIG. 11 are about 29°, and the pitch is about 30 μm. In each of the third prism columns 52, both of the angles $\psi_1$, $\psi_2$ shown in FIG. 12 are about 45°, and the pitch is about 46 μm.

For example, a UV curing type resin, such as an acrylic resin, is coated on the prism mold for the second prism column 43. A commercially available easy-adhesion type polyethylene terephthalate (PET) film (for example, COSMOSHINE A4300, 50 μm thick, made by Toyobo Co., Ltd.) is overlapped on the coated UV curing type resin. The UV curing type resin is flattened by a rubber roller so that the UV curing type resin is uniform. From above the easy-adhesion type PET film, an UV ray is irradiated using a metal halide lamp with an output power of about 1500 mJ. Thereafter, the second prism columns 43 are formed on a main surface of the PET film by removing the PET film from the prism mold.

Next, a UV curing type resin is coated on a prism mold for the first prism column 42. The PET film having the second prism columns 43 on the main surface is overlapped with the main surface up on the UV curing type resin, such that the angle between the ridge line direction of the second prism column 43 and the ridge line direction of the prism mold is about 45°. The UV curing type resin is flattened by a rubber roll so that the UV curing type resin becomes uniform. A UV ray is irradiated (1500 mJ) from a side of the main surface on which the second prism columns 43 are formed. Thereafter, by removing the PET film from the prism mold, the first prism columns 42 are formed on another main surface of the PET film.

In this way, the first and second prism columns 42, 43 are formed on both main surfaces of the PET film. Similarly, a prism mold for the third prism column 52 is used to form third prism columns 53 on one main surface of the other PET film. The PET films in which the prism columns are formed are cut out to the predetermined size, and the first and second prism sheets 41, 51 are fabricated.

The first prism sheet 41 is arranged on the light guide plate 2, such that the ridge line direction of the first prism column 42 and the end surface 2a of the light guide plate 2 are parallel with each other. The second prism sheet 51 is arranged on the first prism sheet 41, such that the angle ξ between the ridge line directions of the third prism column 52 and the first prism column 42 is about 90°.

In evaluating light for the backlight unit having the foregoing structure, a current of about 15 mA is applied to each of the three LEDs used in the light source 1. A luminance measuring apparatus (for example, RISA made by HI-LAND Co., Ltd.) is used to measure front luminance of the center portion of the backlight unit (the display area 34 shown in FIG. 5). Also, luminance angle distribution of the center portion of the backlight unit is measured by using a liquid crystal panel viewing angle measuring apparatus (for example, EZ Contrast made by ELDIM). Relative luminous intensity in each direction is calculated in accordance with the measured luminance angle distribution.

Figures 18, 19:
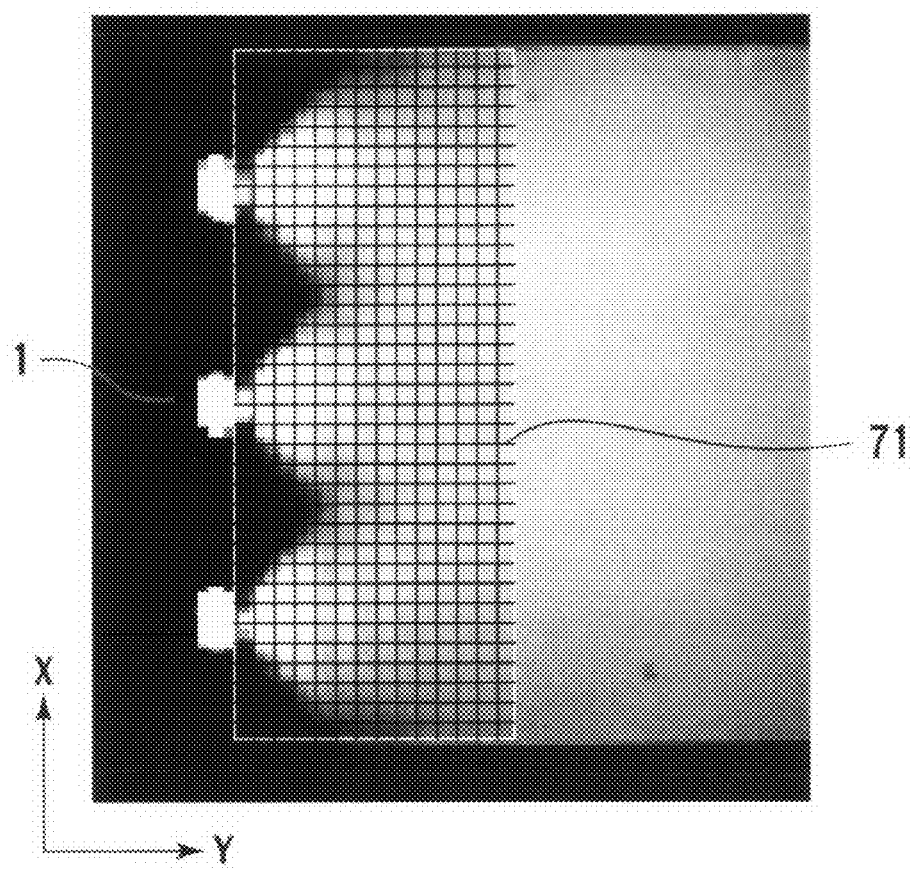
FIG. 18 is a view for describing the definition and measuring method of the light unevenness in the entrance portion of the light guide plate.
FIG. 19 is a table showing an example of measurement results of the light unevenness of a backlight unit using the diffusion sheet.

A measuring method of the light unevenness of the entrance portion of the backlight unit will be described below. FIG. 18 is a front view showing the vicinity of the entrance portion of the backlight unit when the backlight unit is turned on. As shown in FIG. 18, three LEDs of the light source 1 are arrayed along the end surface 2a of the light guide plate 2 shown in FIG. 17. In the vicinity of the light entrance area 35, a width of about 30.8 mm in a direction (X-direction) parallel to the array direction of the light source 1 is divided into 100 sections, and a length of about 9 mm in a direction (Y-direction) orthogonal to the array direction of the light source 1 is divided into 30 sections, so as to form a mesh 71. Front luminance has been measured using the luminance measuring apparatus with positional resolution of a diameter of about 0.1 mm in each section of the mesh 71. A ratio between the minimal and maximal luminance data, that is, (the minimum value)/(the maximum value) among the 100 sections in the X-direction at a certain distance Y away from the light source 1 is defined as a uniformity ratio at the distance Y. The minimum distance Y in which the uniformity ratio is 0.6 or more is defined as "entrance unevenness", or simply "unevenness".

FIG. 19 is a table showing the measurement result of the entrance unevenness and front luminance of Examples 2 to 4 in which diffusion films A, B and C having different hazes are inserted as the diffusion sheet 3. Also, the measurement result of Example 1 in which the diffusion sheet has not been used is shown in FIG. 19 for the sake of the comparison. As shown in FIG. 19, the smallest entrance unevenness is achieved in Example 4 in which the diffusion film C having the highest haze has been used. However, Example 1, in which the diffusion sheet is not used, has the largest front luminance, and as the haze of the diffusion film increases, the front luminance of the center portion of the backlight unit decreases.

Figure 20:
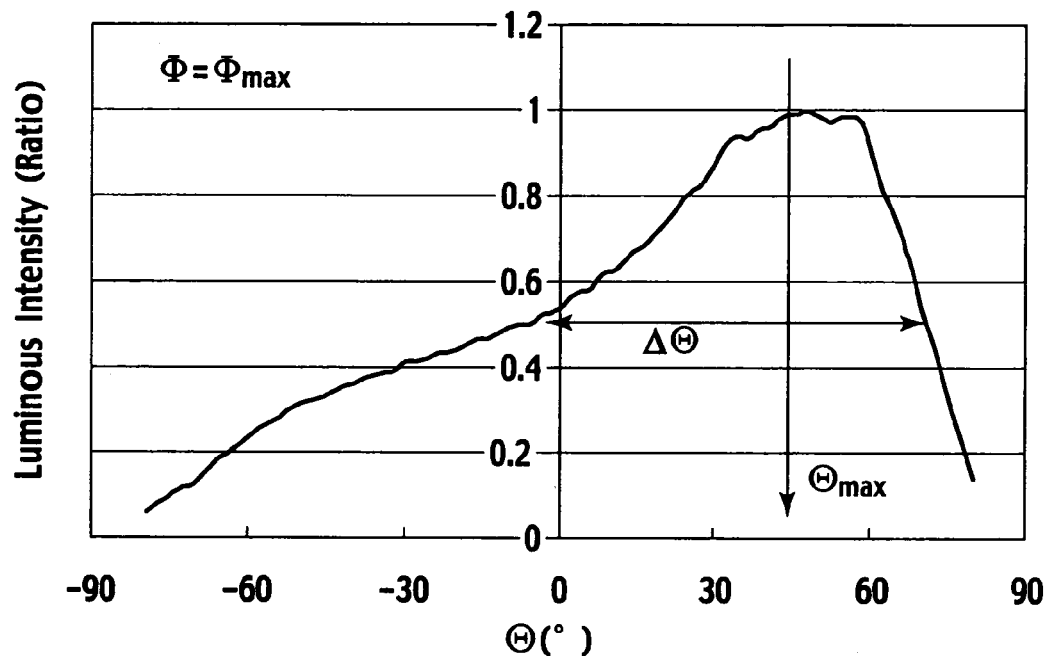
FIGS. 20 and 21 are views showing an example of an angle distribution of luminous intensity of light through the diffusion film.
Figure 21:
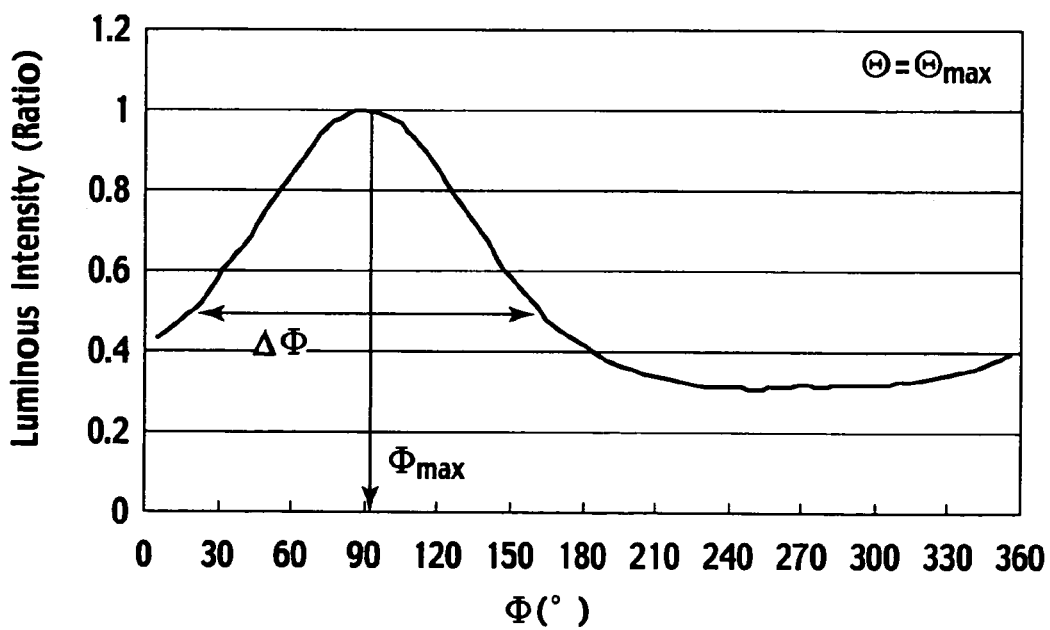

As discussed above, in order to reduce the entrance unevenness and increase the front luminance, only the luminous intensity angle distribution of the output light from the light entrance area of the light guide plate 2 may be similar to that of the light through the diffusion film C. FIGS. 20 and 21 show angle distribution of the luminous intensity through the diffusion film C having a haze of about 91%. As shown in FIGS. 20 and 21, the luminous intensity angle distribution is such that, when the azimuth angle is $\Phi$max, the zenith angle $\Theta$max is about 45° and the FWHM angle $\Delta\Theta$ is about 75°, and when the zenith angle is $\Theta$max, the azimuth angle $\Phi$max is about 90° and the FWHM angle $\Delta\Phi$ is about 145°. That is, when the luminous intensity angle distribution of the output light from the light guide plate 2 near the light entrance area can approximate to the distribution shown in FIG. 20 and FIG. 21, the entrance unevenness can be improved.

Additionally, as shown in FIGS. 20 and 21, there is a considerable degree of skirt shape in the angle distribution. Evidently, the skirt-shaped portion is a portion which deteriorates luminous usage efficiency of the light. Thus, the luminous intensity angle distribution of the output light in the vicinity of the light entrance portion of the light guide plate 2 is preferably θmax of about 45°±15°, Φmax of about 90°, ΔΘ of about 70°±10°, ΔΦ of about 130°±20°, and with less skirt shape, in consideration of usage efficiency of the light.

As the light guide plate 2 used in the backlight unit, if the output property in the vicinity of the light entrance portion is within the range of the above-discussed luminous intensity angle distribution, there are no special limitations on the means for achieving the above-discussed luminous intensity angle distribution. For example, a method for forming a fine irregularity or a plurality of prisms, or for coating or printing a diffusive white coating material and the like, may be applied on at least one of the top surface 2c (emitting surface) and the bottom surface 2b opposite thereto in the vicinity of the light entrance portion of the light guide plate 2. Alternatively, a method for dispersing optical diffusion material into a body of the light guide plate 2 may be applied. Also, a reflection element, such as a plurality of grooves, a spherical lens, a lenticular lens or the like, is provided on at least one of the top surface 2c in the vicinity of the light entrance portion of the light guide plate 2 and the bottom surface 2b opposite thereto. The luminous intensity angle distribution is calculated by ray tracing simulation. A shape of the reflection element is determined such that the calculation result fits into the range of the above-mentioned luminous intensity angle distribution. Thus, there are no limitations to the shape of the reflection element provided in the vicinity of the light entrance portion of the light guide plate 2 in order to improve the entrance unevenness.

Moreover, there are no special limitations to the area ratio of the portion of the reflection element formed in the vicinity of the light entrance portion to the flat portion thereof. If the area ratio of the reflection element in the vicinity of the light entrance portion is excessively high, the large amount of the light is emitted in the vicinity of the light entrance portion, and the luminance in the display area may be decreased. On the other hand, if the area ratio is excessively low, the improvement effect of the entrance unevenness becomes small. Thus, the area ratio of the reflection element in the vicinity of the light entrance portion should be determined in accordance with the specification of the luminance and the distance between the end surface 2a serving as the entrance surface of the light guide plate 2 and the region of the light guide plate 2 corresponding to the display area. In addition, there are no limitations to the shape of the reflection element for changing the direction of the light and emitting the light in the region except the vicinity of the light entrance portion of the light guide plate 2.

Figure 22:
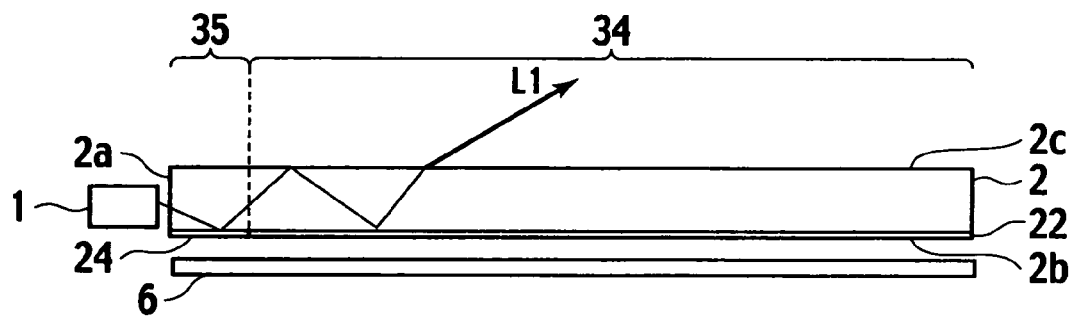
FIG. 22 is a cross sectional view showing an example of the light guide plate according to the embodiment of the present invention.

As shown in FIG. 22, a reflection element (first reflection element) 22 and a reflection element (second reflection element) 24 are provided in the bottom surface 2b of the light guide plate 2. The reflection element 22 is provided in a region (first region) corresponding to the display area 34. The reflection element 24 is provided in a region (second region) corresponding to the light entrance area 35. The reflection element 22 reflects the light that entered from the end surface 2a in a first angle with respect to the bottom surface 2b. The reflection element 24 reflects the light that entered from the end surface 2a in a second angle, which differs from the first angle, with respect to the bottom surface 2b.

Figure 23:
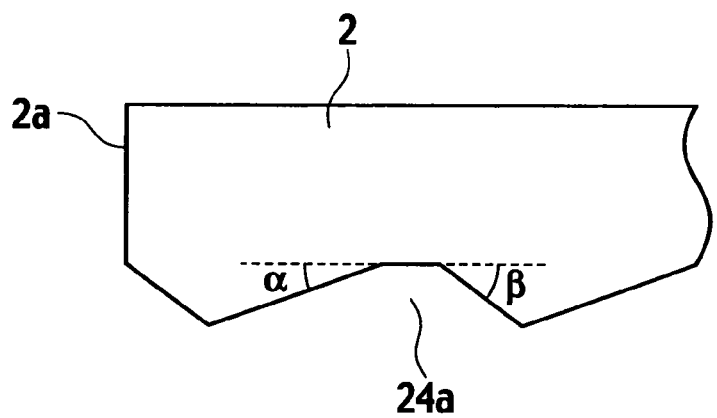
FIG. 23 is a cross sectional view showing an example of the reflection element in the light guide plate according to the embodiment of the present invention.
Figure 24:
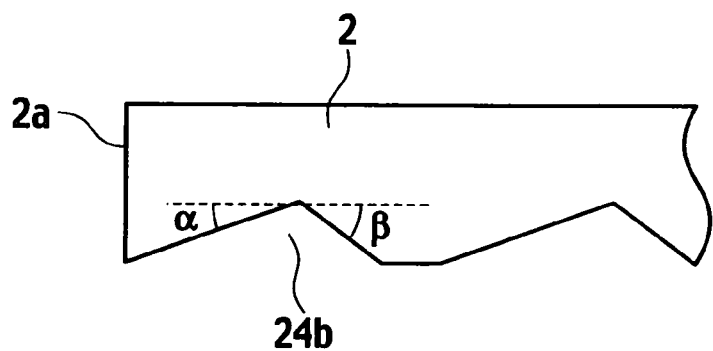
FIG. 24 is a cross sectional view showing another example of the reflection element in the light guide plate according to the embodiment of the present invention.

As shown in FIGS. 23 and 24, for a reflection element 24, a plurality of grooves 24a, 24b having edge lines abutting each other and parallel to the end surface 2a, may be used. Each of the grooves 24a is a trapezoidal groove having a flat portion on the base end of the groove. Each of the grooves 24b is a triangular groove having a flat portion on the top end of the groove. In the grooves 24a, 24b, a slant surface in which the normal toward the inside of the light guide plate 2 intersects the end surface 2a is defined as a first slant surface, and the other slant surface is defined as a second slant surface. A tilt angle between the first slant surface and the normal to the end surface 2a is denoted by α, and a tilt angle between the second slant surface and the normal to the end surface 2a is denoted by β. Here, for the light entering from the end surface 2a, the first slant surface has a reflection function. As a result of the ray tracing simulation, in order to achieve the desired luminous intensity angle distribution of the second region, the reflection element 24 is desirably formed by one type of grooves or by a combination of more than one type of grooves, each having a tilt angle α of 25°±10°.

The grooves 24a, 24b can be formed by injection mold which is easily fabricated by a diamond turning machine and the like. Thus, it is possible to easily fabricate the light guide plate 2 having the desired luminous intensity angle distribution of the second region. There are no special limitations to the tilt angle β of the second slant surface. However, from the viewpoint of easy processing of the injection mold, a tilt angle β of about 75° or less is desired. The light guide plate 2 is provided by injection molding and the like using a highly transparent material, such as polycarbonate, acryl and the like, as mentioned above. However, there are no special limitations to the material of the light guide plate 2 and a fabrication method thereof.

The reflection element 24 may be formed in a distance range within the second region between the end surface 2a, which is the entrance surface of the light, and the first region corresponding to the display area 34. The distance range is desirably shorter by about 1 mm than the distance from the first region, and more desirably shorter by about 1.5 mm than the distance from the first region.

If reflection element 24 is formed in the distance range that is shorter by about 1 mm or by about 1.5 mm than the distance from the first region, there are no special limitations to a reflection element to be formed in a region between the end of the reflection element 24 and the first region. However, a reflection element having the same shape as the reflection element 22, which provides the same angle distribution of the first region, may be formed in the region between the end of the reflection element 24 and the first region. More desirably, a reflection element, which provides an intermediate or continuously changed angle distribution between those of the first and second regions, may be provided in the region between the end of the reflection element 24 and the first region.

Thus, in the embodiment, in order to achieve the predetermined luminous intensity angle distribution in the vicinity of the light entrance portion, the grooves having a tilt angle α of about 25°±10° is formed in the vicinity of the light entrance portion the light guide plate 2. As a result, it is possible to achieve a backlight unit having uniform luminance, and without brightness unevenness in the vicinity of the end surface 2a to which the light from the light source 1 enters.

Figure 25:
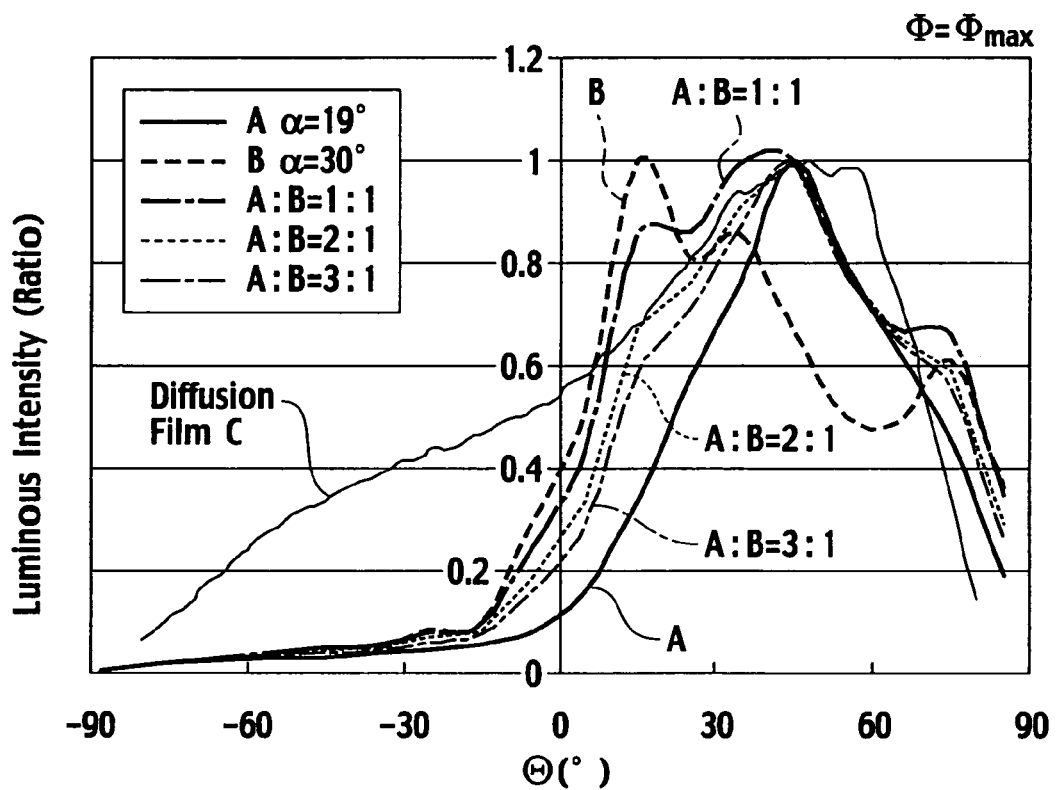
FIGS. 25 and 26 are views showing calculation results of angle distributions of luminous intensities of the light guide plate according to the embodiment of the present invention.
Figure 26:
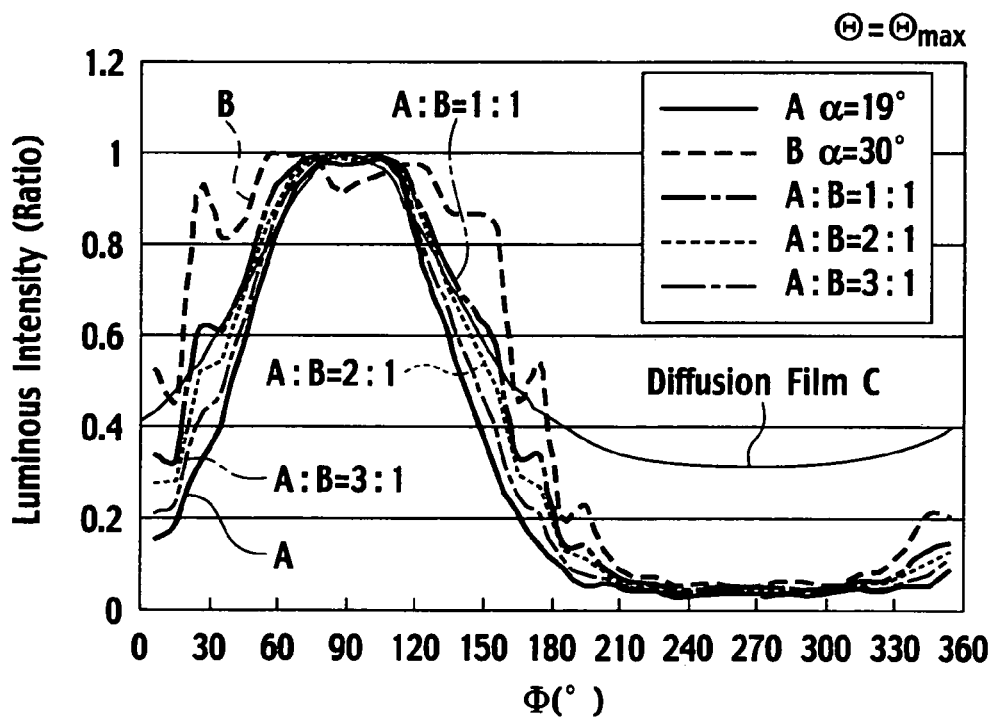

For the second region corresponding to the light entrance area 35 of the light guide plate 2 shown in FIG. 22 having the grooves 24a as the reflection element 24, ray tracing simulation has been performed while changing the tilt angle α of each groove 24a shown in FIG. 23. FIGS. 25 and 26 show the calculation result of the luminous intensity angle distribution of the output light for a groove pattern A having a tilt angle α of about 19° and a groove pattern B having a tilt angle a of about 30°. Also, the measurement result of the luminous intensity angle distribution through the diffusion film C having a haze of about 91% on the light guide plate 2 is shown in FIGS. 25 and 26. Moreover, the luminous intensity angle distribution has been also calculated when the groove patterns A and B are combined with ratios of 1:1, 2:1 and 3:1.

Figure 27:
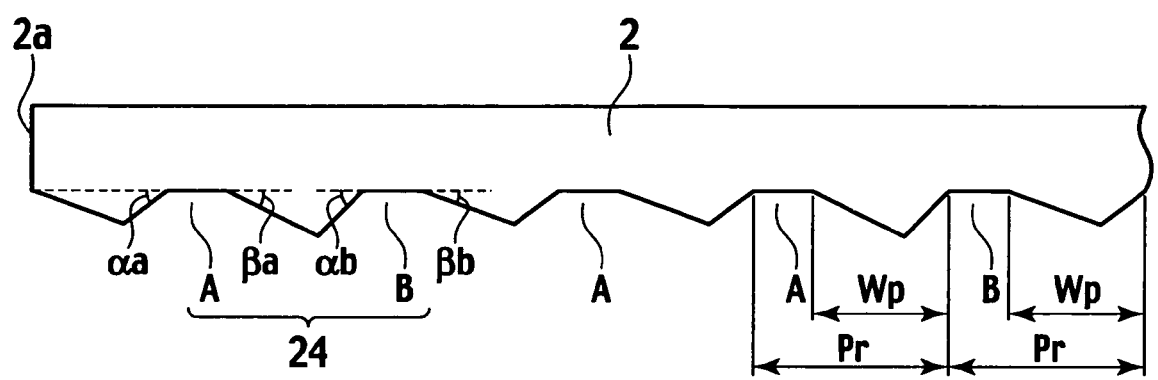
FIG. 27 is a cross sectional view showing another example of the reflection element in the light guide plate according to the embodiment of the present invention.
Figure 28:
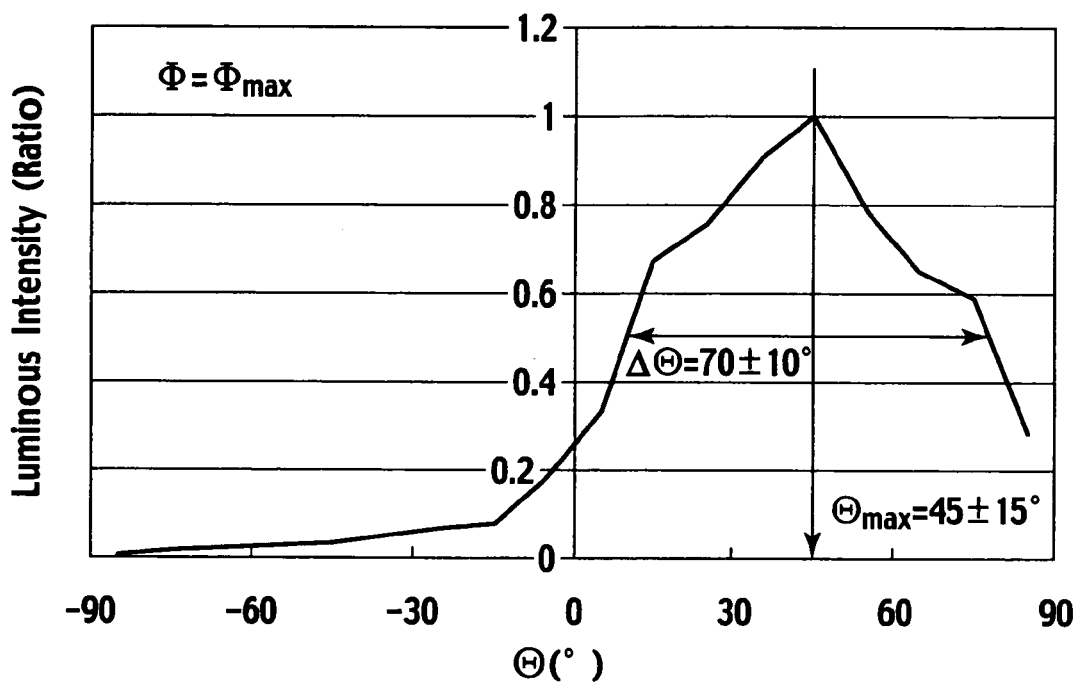
FIGS. 28 and 29 are views showing an example of angle distributions of luminous intensities of the light guide plate according to the embodiment of the present invention.
Figure 29:
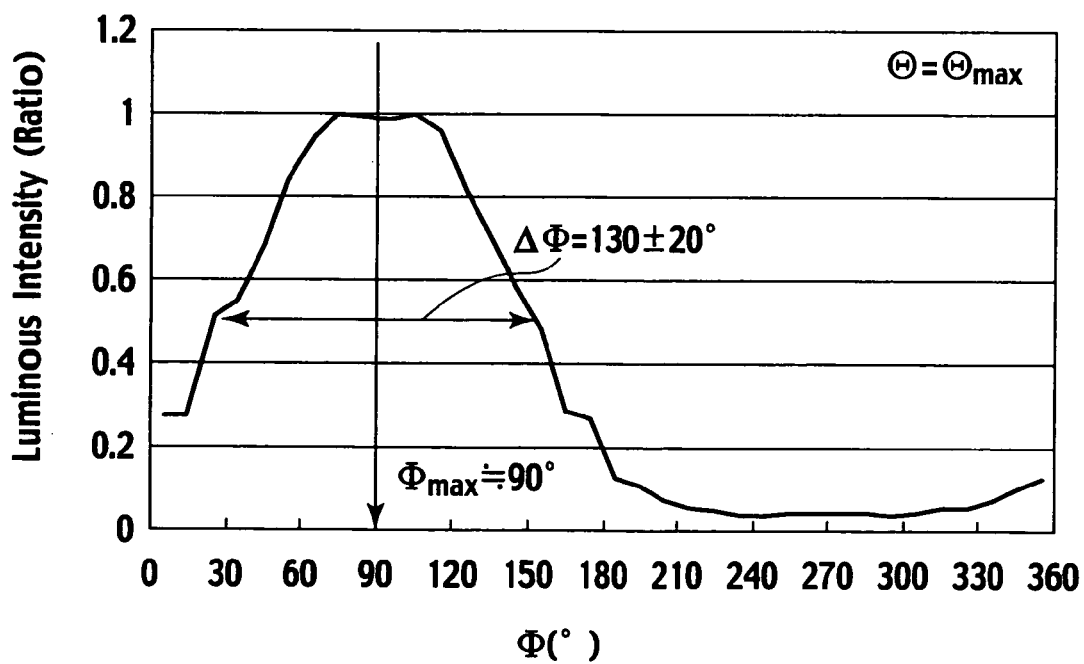

FIG. 27 shows the reflection element 24 when the groove patterns A and B are combined at a ratio of 2:1. As shown in FIG. 27, both of tilt angles βa and βb of the grove patterns A and B having the tilt angle αa of about 19° and about 30°, respectively, are about 11°. Both widths Wp of the triangular ridges of the groove patterns A and B are about 0.0435 mm, and both pitches Pr of the groove patterns A and B are about 0.0925 mm.

As shown in FIG. 25, the angle distribution of light guide plate 2 using the groove pattern A, the FWHM angle ΔΘ is small as compared with the case of the diffusion film C. In the case of the groove B, although the FWHM angle ΔΘ increases, the zenith angle Θmax at the maximum luminous intensity is deviated to about 15°. When the groove patterns A and B are combined at the ratios of 1:1, 2:1 and 3:1, the angle distributions approximate to the angle distribution of the diffusion film C. In the case of A:B=2:1, as shown in FIGS. 25 and 26, the zenith angle Θmax is about 45°, the FWHM angle ΔΘ is about 68°, the azimuth angle Φmax is about 90°, and the FWHM angle ΔΦ is about 131°. Thus, the light guide plate 2 in which the groove patterns A, B are used at the ratio of 2:1 satisfies the luminous intensity angle distribution determined by using the diffusion film C.

Thus, in order to improve the entrance unevenness, the luminous intensity angle distribution of the output light in the vicinity of the light entrance portion of the light guide plate 2 may be Θmax of about 45°±15°, Φmax of about 90°, ΔΘ of about 70°±10°, and ΔΦ of about 130°±20°. Here, when Θmax is outside the above-discussed preferable range of the luminous intensity angle distribution, the improvement effect of the entrance unevenness is small. Furthermore, when ΔΘ is less than 60° or ΔΦ is less than 110°, dispersion of the output light is small, and the improvement effect of the entrance unevenness is small. When ΔΘ exceeds 80° or ΔΦ exceeds 150°, the angle distribution of the output light is excessively spread, and the luminance is decreased. Consequently, in order to increase the luminance of the light entrance area to a level of the display area, it is necessary to emit a large amount of the light in the vicinity of the light entrance portion. As a result, the amount of light used in the display area is decreased, and the luminance of the backlight unit is decreased. Hence, the angle distribution, in which ΔΘ exceeds 80° or ΔΦ exceeds 150°, is not desirable. In addition, a Φmax of about 90° is typical for the light guide plate.

(Backlight Unit)

The backlight unit according to the embodiment of the present invention includes a light source 1, a light guide plate 2, a lens sheet (41, 51) and a reflection sheet 6, as shown in FIG. 5. The light guide plate 2 has reflection elements 22, 24 on the bottom surface 2b. The reflection element 22 is formed in the first region corresponding to the display area 34 of the backlight unit. The shape and arrangement of the reflection element 22 are designed such that the positional luminance distribution of the output light from the light guide plate 2 becomes uniform, by ray tracing simulation in the display area 34. The reflection element 24 is formed in the second region corresponding to the light entrance area 35 of the backlight unit. The groove pattern shown in FIG. 26, in which the ratio between the grooves A and B is 2:1, is used for the reflection element 24.

The reflection element 24 is provided in a range of a distance LK from the end surface 2a of the light guide plate 2, as shown in FIG. 5. The distance LK is shorter than the distance LL between the end surface 2a of the light guide plate 2 and the display area 34. Specifically, the distance LL is about 3.5 mm, and the distance LK is about 2 mm.

In a table shown in FIG. 30, measurement results of the front luminance and the entrance unevenness of the backlight unit having the foregoing structure are presented as Example 5. Also, in the table of FIG. 30, the measurement results of the backlight units, which are manufactured by changing the surface forming the reflection element, the arrangement of the first prism column to the entrance surface, and the angles γ, θ1, θ2, φ1, φ2, ξ, ψ1 and ψ2, are presented as Examples 6 to 23 and Comparative Examples 3 to 15. Moreover, in the table of FIG. 30, measurement results of the backlight units shown in FIGS. 1 and 3 are presented.

Each of the prism sheets 4, 5 in Comparative Example 1 shown in FIG. 1 is a single-sided upward prism sheet having prism columns, each of which has an isosceles triangle cross sectional shape with an apex angle of about 90° and a pitch of about 50 μm. The prism sheet 4 is arranged such that the ridge line direction of each prism column is parallel to the end surface 2a. The prism sheets 4, 5 are arranged such that the prism columns of the prism sheet 4, 5 are orthogonal to each other. Between the light guide plate 2 and the prism sheet 4, a commercially available diffusion film (for example, LIGHTUP 50LSE made by Kimoto Co., Ltd.), in which beads are dispersed in resin, is provided as the diffusion sheet 3. The diffusion sheet 3 has the haze of about 89%. Comparative Example 1 is currently the most common configuration of the backlight unit. In Comparative Example 1, the front luminance is about 3510 cd/m², and the entrance unevenness is about 2.7 mm.

Figure 3:
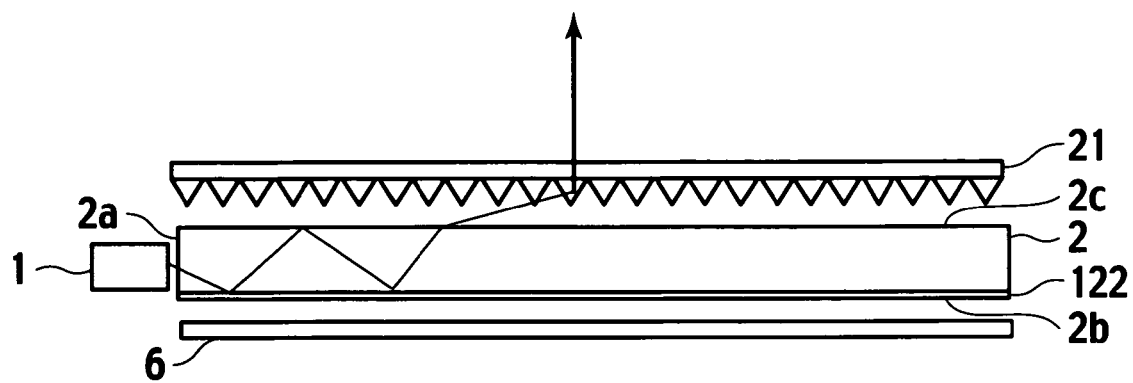
FIG. 3 is a schematic view showing another example of a configuration of a conventional backlight unit.
Figure 4:
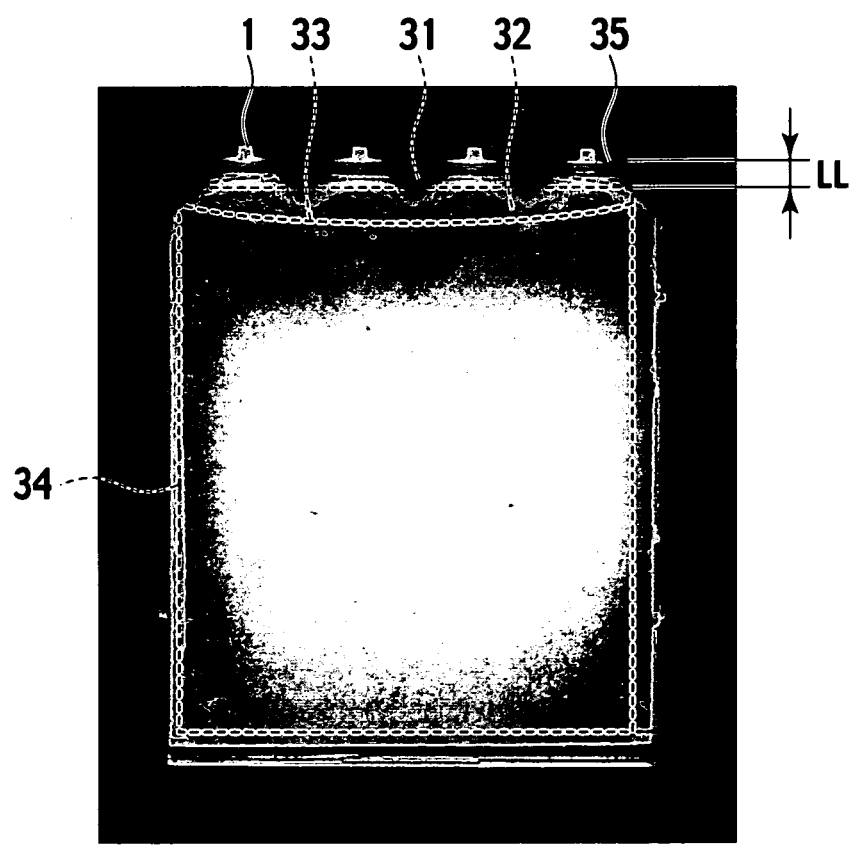

The prism sheet 21 in Comparative Example 2 shown in FIG. 3 is a single-sided downward prism sheet having prism columns, each of which has an isosceles triangle cross sectional shape with an apex angle of about 63° and a pitch of about 30 μm. The prism sheet 21 is arranged such that the ridge line direction of each prism column is parallel to the end surface 2a. A commercially available diffusion film (for example, LIGHTUP 50TL2 made by Kimoto Co., Ltd.), in which beads are dispersed in resin, is provided on the prism sheet 21, as the diffusion sheet 3. The diffusion sheet 3 has the haze of about 30%. In Comparative Example 2, the front luminance is about 4920 cd/m², and the entrance unevenness is about 5.7 mm.

As shown in the table of FIG. 30, the front luminance, which is between about 3530 cd/m² and about 4570 cd/m², is improved in all of Examples 5 to 23 as compared with Comparative Example 1. Also, the entrance unevenness, which is between about 3 mm and about 4.3 mm, is improved in all of Examples 5 to 23, as compared with Comparative Example 2. Thus, in the backlight unit according to the embodiment, it is possible to increase the front luminance and to reduce the entrance unevenness, compared with the conventional backlight unit.

In Example 5, the reflection elements 22, 24 are formed on the bottom surface 2b of the light guide plate 2. Example 6 differs from Example 5 in that the reflection elements 22, 24 are formed on the top surface 2c. Other configurations including the first prism sheets 41, 51 are similar in both Examples 5 and 6. Example 6 is excellent in both the front luminance and the entrance unevenness, as compared with Example 5.

Thus, it is more desirable to form the reflection elements 22, 24 on the top surface 2c than on the bottom surface 2b.

Example 7 differs from Example 6 in that the angle θ1 of the first prism column 42 is 15° and both the angles ψ1, ψ2 of the third prism column 52 are 45°. Other configurations are as in Example 6. Example 8 differs from Example 7 in that the ridge line of the first prism column 42 is arranged perpendicular to the end surface 2a. Comparative Example 3 differs from Example 7 in that the ridge line of the first prism column 42 is arranged with an angle of about 20° relative to the end surface 2a. Examples 7 and 8 are excellent in both the front luminance and the entrance unevenness, as compared with Comparative Example 3. Also, Example 8 is slightly superior in the front luminance to Example 7. Thus, it is desirable to arrange the first prism column 42 substantially parallel or perpendicular to the end surface 2a. Moreover, it is more desirable to arrange the first prism column 42 substantially parallel to the end surface 2a.

Examples 9, 10 and Comparative Examples 4, 5 differ from Example 7, in the angle γ between the ridge line directions of the first and second prism columns 42, 43. Other configurations are as in Example 7. In Examples 9, 10 having the angles γ of about 35° and about 45°, respectively, the front luminance and the entrance unevenness is decreased, compared with Example 7 having the angle γ of about 45°. In Comparative Examples 4, 5 having the angles γ of about 30° and about 60°, respectively, the front luminance is decreased but the entrance unevenness is similar, compared with Examples 7, 9 and 10. Thus, the angle γ is desirably in a range of about 35° to about 55°.

Examples 11, 12 and Comparative Example 6 are different from Example 7, in the angle θ1 of the first prism column 42. Other configurations are as in Example 7. In Example 11 having the angle θ1 of about 20°, the front luminance is decreased and the entrance unevenness is approximately equal, compared with Example 7 having the angle θ1 of about 15°. In Example 12 having the angle θ1 of about 10°, the front luminance and the entrance unevenness are increased, compared with Example 7. In Comparative Example 6 having the angle θ1 of about 25°, the front luminance is decreased but the entrance unevenness is similar, compared with Examples 7, 11 and 12. Thus, the angle θ1 is desirably in a range of about 20° or less.

Examples 13, 14 and Comparative Examples 7, 8 are different from Example 7, in the angle θ2 of the first prism column 42. Other configurations are as in Example 7. In Example 13 having the angle θ2 of about 40°, the front luminance is decreased and the entrance unevenness is approximately equal, compared with Example 7 having the angle θ2 of about 48°. In Example 14 having the angle θ2 of about 55°, the front luminance is decreased and the entrance unevenness is increased, compared with Example 7. In Comparative Examples 7, 8 having the angles θ2 of about 35° and about 60°, respectively, the front luminance is decreased but the entrance unevenness is similar, compared with Examples 7, 13 and 14. Thus, the angle θ2 is desirably in a range of about 40° to about 55°.

Examples 15, 16 and Comparative Examples 9, 10 are different from Example 7, in the angles φ1, φ2 of the second prism column 43. Other configurations are as in Example 7. In Example 15 having both the angles φ1, φ2 of about 25°, the front luminance is decreased and the entrance unevenness is approximately equal, compared with Example 7 having both the angles φ1, φ2 of about 29°. In Example 16 having both the angles φ1, φ2 of about 35°, the front luminance and the entrance unevenness are decreased, compared with Example 7. In Comparative Examples 9, 10 having both the angles φ1, φ2 of about 20° and about 40°, respectively, the front luminance is decreased and the entrance unevenness is similar, compared with Examples 7, 15 and 16. Thus, both the angles φ1, φ2 are desirably in a range of about 25° to about 35°.

Examples 17 to 21 and Comparative Examples 11 to 13 are different from Example 7, in the angles ψ1, ψ2 of the third prism column 52. Other configurations are as in Example 7. In Example 17 having the angles ψ1, ψ2 of about 15° and about 48°, in Example 18 having the angles ψ1, ψ2 of about 5° and about 48°, and in Example 19 having the angles ψ1, ψ2 of about 20° and about 48°, respectively, the front luminance is increased and the entrance unevenness is approximately equal, compared with Example 7 having both the angles ψ1, ψ2 of about 45°. In Example 20 having the angles ψ1, ψ2 of about 15° and about 40° and Example 21 having the angles ψ1, ψ2 of about 15° and about 55°, respectively, the front luminance is decreased and the entrance unevenness is approximately equal, compared with Example 7. In Comparative Example 11 having the angles ψ1, ψ2 of about 55° and about 48°, and Comparative Example 12 having the angles ψ1, ψ2 of about 15° and about 35°, and Comparative Example 13 having the angles ψ1, ψ2 of about 15° and about 60°, respectively, the front luminance is decreased compared with Examples 7 and 17 to 21. In Comparative Example 11, the entrance unevenness is similar compared with Examples 7 and 17 to 21. However, in Comparative Examples 12, 13, the entrance unevenness is increased compared with Examples 7 and 17 to 21. Thus the angle ψ1 is desirably in a range of about 5° to about 45°, and the angle ψ2 is desirably in a range of about 40° to about 55°.

Examples 22, 23 and Comparative Examples 14, 15 are different from Example 7, in the angle ξ between the first and third prism columns 42, 52 and the angles ψ1, ψ2. Other configurations are as in Example 7. In Example 22 having the angles ξ, ψ1 and ψ2 of about 100°, about 15° and about 48°, respectively, and in Example 23 having the angles ξ, ψ1 and ψ2 of about 80°, about 15° and about 48°, respectively, the front luminance is slightly decreased and the entrance unevenness is approximately equal, compared with Example 7 having the angles ξ, ψ1 and ψ2 of about 90°, about 45° and about 45°, respectively. In Comparative Example 14 having the angles ξ, ψ1 and ψ2 of about 105°, about 20° and about 48°, respectively, and in Example 15 having the angles ξ, ψ1 and ψ2 of about 75°, about 20° and about 48°, respectively, the front luminance is decreased and the entrance unevenness is similar, compared with Examples 7, 22 and 23. As mentioned above, the angle ξ is desirably in a range of about 80° to about 100°.

In Examples 5 to 23, the distance LL between the end surface 2a serving as the entrance surface and the display area 34 is about 3.5 mm, and the distance LK where the reflection element 24, which has a different output property from the reflection element 22, is about 2 mm. Thus, by reducing the distance LK to be shorter than the distance LL, the entrance unevenness of the backlight unit can be improved. Actually, in the back light unit, it is common to provide a black light shielding tape so as to cover the light entrance region of the distance LL and the light source 1. For example, if the reflection element 24 is formed beyond the distance LL, since the reflection element 24 has the different reflection property from the reflection element 22 formed in the first region corresponding to the display area 34, the boundary due to the different shapes between the reflection element 22, 24 become clearly visible, and also the difference of the brightness becomes clear.

If the distance LK is less than the distance LL but longer than (LL−1.5) mm, it is difficult to practically reduce the entrance unevenness. This is because, since the reflection element 24 has different shape and output property from the reflection element 22, it is impossible to perfectly conform the brightness of the boundary region between the display area 34 and the light entrance area 35 in all viewing directions. As a result, the difference of the brightness becomes visible over the boundary between the display area 34 and the light entrance area 35.

Figure 31:
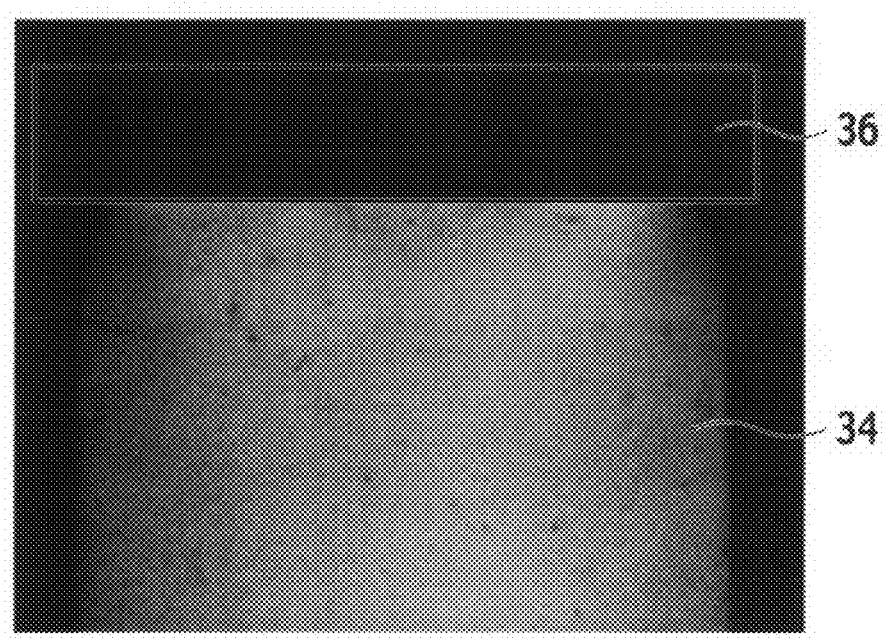
FIGS. 31 and 32 are views describing appearance evaluation of the backlight unit according to the embodiment of the present invention.
Figure 32:
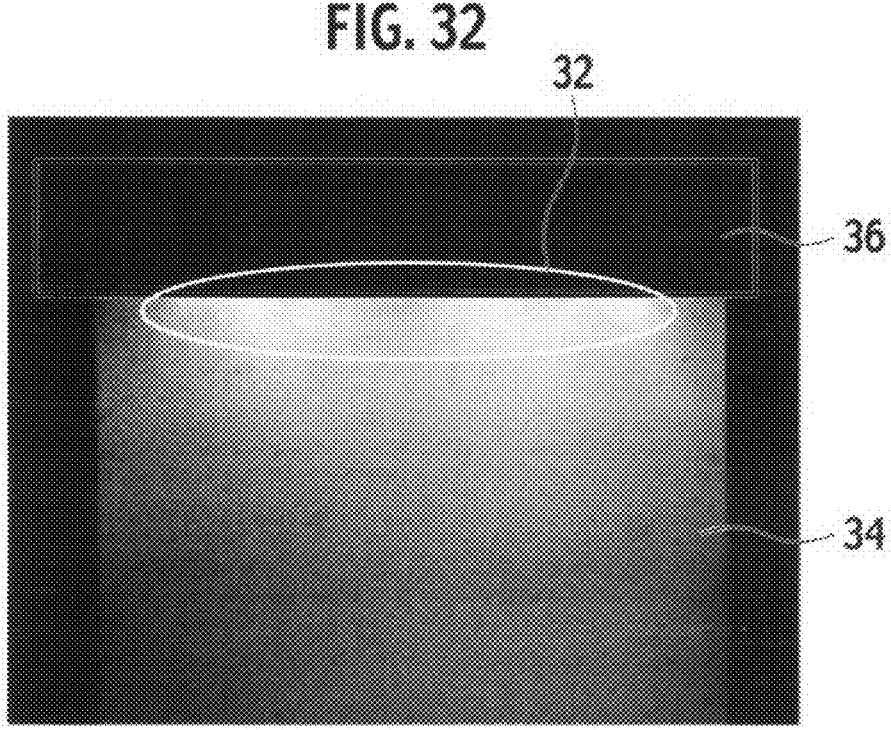

Experimental light guide plates have been fabricated by changing the distance (area) in which the reflection element 24 having a different shape from the reflection element 22 formed in the first region corresponding to the display area 34 has been formed and assembled into the backlight unit. As shown in FIGS. 31 and 32, lighting evaluation has been performed by masking the light entrance area 35, which is the non-display area, with a light shielding tape 36. As a result, it has been determined that, when the distance LK is (LL−1.5) mm or less, the unevenness caused by the luminance difference due to the shape difference between the reflection elements 22, 24 may not be observed.

Specifically, in the backlight unit shown in FIG. 5, the reflection elements 22, 24 have been formed on the top surface 2c of the light guide plate 2. The distance LL between the end surface 2a and the first region corresponding to the display area 34 is set to about 3.5 mm. The light guide plates 2 having the reflection elements 24 in the range of the different distances LK from the end surface 2a have been fabricated. The distances LK are set to about 1.7 mm, about 2 mm, about 2.5 mm, and about 3.0 mm, respectively. The total number of the grooves A, B shown in FIG. 27 are 18, 21, 27 and 33 in the respective distance LK.

Figure 33:
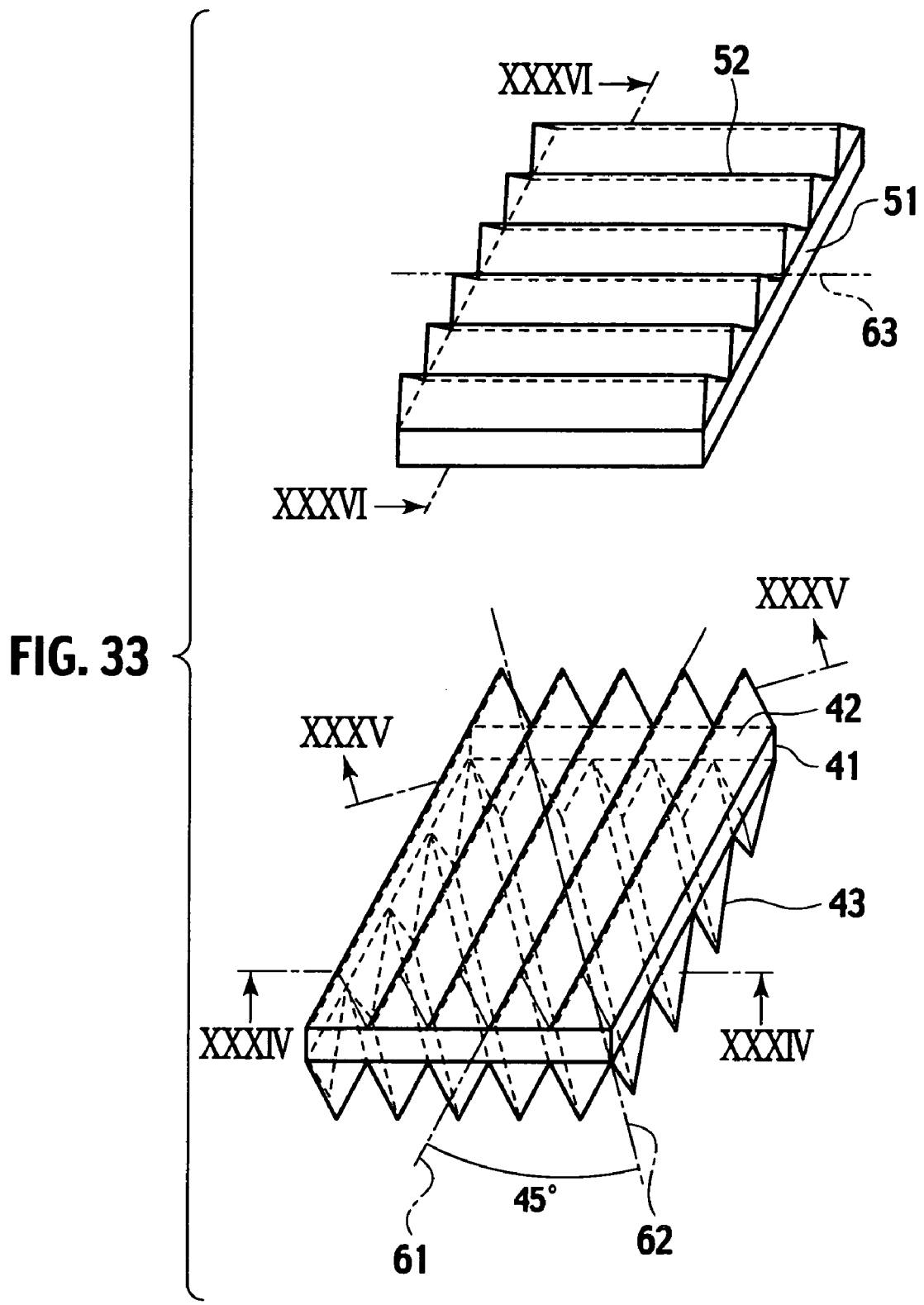
FIGS. 33 to 36 are schematic views showing an example of the prism sheet used in the description of the embodiment of the present invention.

As shown in FIG. 33, on the top surface of the prism sheet 41, a plurality of first prism columns 42 are arranged adjacent to each other so that the ridge line direction 61 is parallel to the end surface 2a of the light guide plate 2. On the bottom surface of the prism sheet 41, a plurality of second prism columns 43 are arranged adjacent to each other so that the angle between the ridge line direction 62 and the ridge line direction 61 of the first prism columns 42 is about 45°. On the top surface of the prism sheet 51, a plurality of third prism columns 52 are arranged adjacent to each other so that the angle between the ridge line direction 63 and the ridge line direction 61 of the first prism columns 42 is about 90°.

Figure 34:
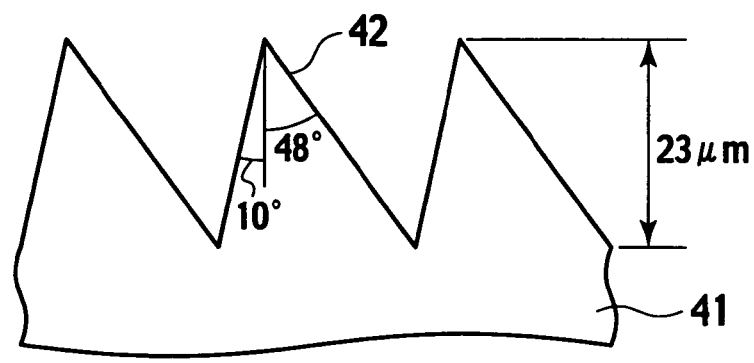
Figure 35:
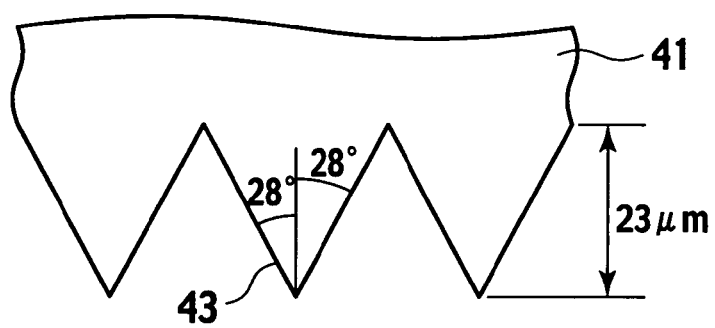
Figure 36:
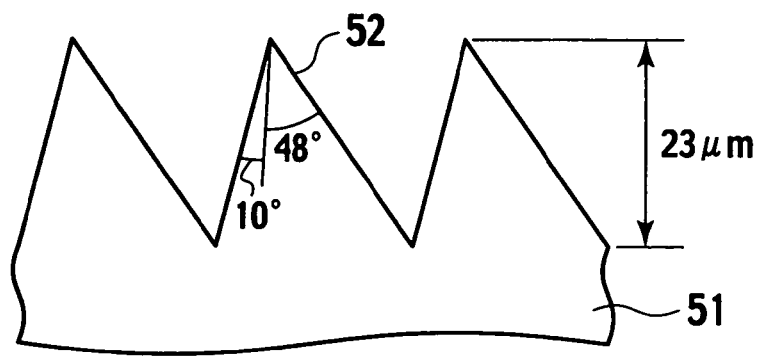

As shown in FIG. 34, angles between the normal line of the first prism sheet 41 and each of two slant surfaces of the first prism columns 42 in the first prism sheet 41 are about 10° and about 48°, respectively. As shown in FIG. 35, both angles between the normal line of the first prism sheet 41 and each of two slant surfaces of the second prism columns 43 in the first prism sheet 41 are about 28°. As shown in FIG. 12, angles between the normal line of the second prism sheet 51 and each of two prism surfaces of the third prism columns 52 in the second prism sheet 51 are about 10° and about 48°, respectively. Each height of the first to third prism columns 43, 42 and 52 is about 23 μm.

The measurement of the entrance unevenness and appearance evaluation has been performed for the backlight unit having each light guide plate 2 and the first and second prism sheets 41, 51, fabricated as discussed above. The light source 1 and the second region in the distance LL from the end surface 2a have been masked with the black light shielding tape 36, and the appearance of the backlight unit has been observed. The appearance evaluation has been performed such that, as shown in FIGS. 31 and 32, a pass (G) or a fail (NG) has been determined by locally viewing a bright portion 32 at the boundary between the display area 34 and the light shielding tape 36. In the case of FIG. 31, since the bright portion 32 is not viewed, it is determined as "G". In the case of FIG. 32, since the bright portion 32 is viewed, it is determined as "NG".

A table of FIG. 37 shows the evaluation results of Examples 24 to 27. The entrance unevenness values of Examples 24 to 27 are in a range of about 3.3 mm to about 3.8 mm, and shorter as compared with Comparative Example 2 shown in the table of FIG. 30. Thus, in Examples 24 to 27, the entrance unevenness is improved. The appearance of each of Examples 24 and 25, in which the distance LK is about 2 mm or less, is excellent.

Thus, as the range in which the reflection element 24 is formed, the distance LK is preferably about (LL−1.5) mm or less in order to improve the entrance unevenness of the light entrance portion of the backlight unit. Moreover, when the distance LK is excessively short, the improvement effect of the entrance unevenness is reduced. Thus, as the lower limit of the range in which the reflection element 24 is formed, the distance LK is preferably (LL−1.5) mm or less, and to be as close as possible to (LL−1.5) mm. Also, the distance LK depends on the thickness of the light guide plate 2 and the output property in the vicinity of the light entrance portion. For example, when the thickness of the light guide plate 2 is about 1 mm or less, the condition of (LL−1.5) mm or less is effective as the distance LK.

Thus, according to the backlight unit according to the embodiment, it is possible to reduce a number of parts since the diffusion sheet has no use, and also to decrease entrance unevenness with high luminance efficiency.

OTHER EMBODIMENTS

The present invention has been described as mentioned above. However the descriptions and drawings that constitute a portion of this disclosure should not be perceived as limiting this invention. Various alternative embodiments and operational techniques will become clear to persons skilled in the art from this disclosure.

What is claimed is:

1. A backlight unit comprising:

a light source;

a light guide plate surrounded by two main surfaces and a plurality of end surfaces connecting the main surfaces, the main surfaces are substantially orthogonal to the end surfaces, one of the end surfaces facing the light source is designated as an entrance surface, one of the main surfaces is designated as an emitting surface;

a first prism sheet provided above the light guide plate, having a plurality of first prism columns abutting each other on a top surface of the first prism sheet and a plurality of second prism columns abutting each other on a bottom surface of the first prism sheet, each of the first prism columns has a first ridge line parallel or perpendicular to the entrance surface, each of the second prism columns has a second ridge line extending in a different direction from the first ridge line;

a second prism sheet provided above the first prism sheet, having a plurality of third prism columns abutting each other on a top surface of the second prism sheet, each of the third prism columns has a third ridge line extending in a direction different from the first and second ridge lines; and a reflection sheet facing the light guide plate below the light guide plate.

2. The backlight unit of claim 1, wherein an angle between the first and third ridge lines is in a range of about 80° to about 100°.

3. The backlight unit of claim 1, wherein the first ridge line is parallel or orthogonal to the entrance surface.

4. The backlight unit of claim 1, wherein an angle between the first and second ridge lines is in a range of about 35° to about 55°.

5. The backlight unit of claim 4, wherein angles between the normal to a top surface of the first prism sheet and a slant surface designated to a side of the entrance surface, of each of the first prism columns, and between the normal to the top surface of the first prism sheet and another slant surface of each of the first prism columns are in a range of about 5° to about 20°, and in a range of about 40° to about 55°, respectively.

6. The backlight unit of claim 4, wherein each angle between the normal to a top surface of the first prism sheet and both slant surfaces of each of the second prism columns is in a range of about 25° to about 35°.

7. The backlight unit of claim 4, wherein angles between the normal to a top surface of the third prism sheet and slant surfaces of each of the third prism columns are in a range of about 5° to about 55°, and in a range of about 40° to about 55°, respectively.

8. The backlight unit of claim 1, wherein the light guide plate has a reflection surface substantially perpendicular to the entrance surface.

9. The backlight unit of claim 8, wherein the reflection surface comprises:
   a first reflection element provided in a first region of the reflection surface separated from the entrance surface, and configured to reflect a light incident from the entrance surface in a first angle with respect to the reflection surface; and
   a second reflection element provided in a second region of the reflection surface between the entrance surface and the first region, and configured to reflect the light in a second angle different from the first angle with respect to the reflection surface.

10. The backlight unit of claim 9, wherein the second reflection element includes a plurality of grooves each having a ridge line parallel to the entrance surface.

11. The backlight unit of claim 9, wherein the second reflection element is formed in the second region separated from an edge of the first region to the entrance surface by about 1.5 mm or more.

12. The backlight unit of claim 9, wherein the reflection surface is the emitting surface.

13. The backlight unit of claim 9, wherein the reflection surface is an opposite surface of the emitting surface.

14. The backlight unit of claim 9, wherein, when defining a zenith angle as an angle between the emitted light from the emitting surface and the normal to the emitting surface, and an azimuth angle as an angle between a projection line of the emitted light to the emitting surface and a parallel line to the entrance surface, a distribution of the second angle is the zenith angle of about 45°±15° and the azimuth angle of about 90° where a luminance intensity is maximal, a full width at half maximum angle of the zenith angle of about 70°±10°, and a full width at half maximum angle of the azimuth angle of about 130°±20°.

15. The backlight unit of claim 10, wherein the grooves includes more than two types of grooves having different shapes with each other.

16. The backlight unit of claim 10, wherein each of the grooves has a slant surface in which the normal to the slant surface toward the inside of the light guide plate intersects the entrance surface, and a tilt angle between the slant surface and the normal to the entrance surface is about 25°±10°.

* * * * *